United States Patent
Yamawaki et al.

(10) Patent No.: US 12,003,005 B2
(45) Date of Patent: Jun. 4, 2024

(54) METHOD OF SELECTING ADHESIVE AND POWER GENERATION CELL

(71) Applicant: HONDA MOTOR CO., LTD., Tokyo (JP)

(72) Inventors: Takuma Yamawaki, Wako (JP); Masaru Oda, Wako (JP); Takaaki Shikano, Wako (JP); Shohei Toyota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 17/671,735

(22) Filed: Feb. 15, 2022

(65) Prior Publication Data

US 2022/0302474 A1    Sep. 22, 2022

(30) Foreign Application Priority Data

Mar. 19, 2021   (JP) .................. 2021-046204

(51) Int. Cl.
*H01M 8/0284* (2016.01)
*H01M 8/0206* (2016.01)
(Continued)

(52) U.S. Cl.
CPC ....... *H01M 8/0284* (2013.01); *H01M 8/0206* (2013.01); *H01M 8/0267* (2013.01); *H01M 8/0286* (2013.01); *H01M 8/1004* (2013.01)

(58) Field of Classification Search
CPC ............. H01M 8/0284; H01M 8/0206; H01M 8/0267; H01M 8/0286; H01M 8/1004; H01M 8/0273; H01M 8/242
See application file for complete search history.

(56) References Cited

U.S. PATENT DOCUMENTS

2007/0065703 A1    3/2007  Abd Elhamid et al.
2007/0184326 A1*   8/2007  Sompalli ............. H01M 4/8817
                                                            429/510
(Continued)

FOREIGN PATENT DOCUMENTS

CN         1971988 A    5/2007
CN       110224162 A    9/2019
(Continued)

OTHER PUBLICATIONS

Office Action dated Nov. 8, 2022 issued over the corresponding Japanese Patent Application No. 2021-046204 with the English translation thereof.

(Continued)

*Primary Examiner* — Stewart A Fraser
(74) *Attorney, Agent, or Firm* — Carrier, Shende & Associates P.C.; Joseph P. Carrier; Jeffrey T. Gedeon

(57) ABSTRACT

A method of selecting a thermoplastic-resin adhesive provided so as to be exposed to a fluid flow path of a power generation cell includes a load application step, an exposing step, a measurement step, and a selecting step. In the load application step, a compressive load is applied to a laminate body in a laminating direction thereof, the laminate body being formed by sandwiching an adhesive between a first resin film and a second resin film. In the exposing step, the laminate body is exposed to an environment heated to a predetermined temperature and humidified to a predetermined humidity. In the measurement step, a flow amount of the adhesive during the exposing step is measured. In the selecting step, the adhesive having the flow amount equal to or less than a predetermined amount is selected as an adhesive used for the power generation cell.

3 Claims, 16 Drawing Sheets

(51) Int. Cl.
    *H01M 8/0267*    (2016.01)
    *H01M 8/0286*    (2016.01)
    *H01M 8/1004*    (2016.01)

(56) References Cited

U.S. PATENT DOCUMENTS

| | | | |
|---|---|---|---|
| 2016/0181630 A1* | 6/2016 | Bauer | H01M 8/2483 |
| | | | 156/182 |
| 2019/0273269 A1* | 9/2019 | Ebato | H01M 8/1004 |
| 2019/0334183 A1 | 10/2019 | Ebato et al. | |

FOREIGN PATENT DOCUMENTS

| | | |
|---|---|---|
| CN | 110416589 A | 11/2019 |
| CN | 110444790 A | 11/2019 |
| CN | 111052470 A | 4/2020 |
| JP | 2007-035296 A | 2/2007 |
| JP | 2016-162650 A | 9/2016 |
| JP | 2017-068956 A | 4/2017 |
| JP | 2017-111962 A | 6/2017 |
| JP | 2017-168364 A | 9/2017 |
| JP | 2017-168370 A | 9/2017 |

OTHER PUBLICATIONS

Office Action dated Apr. 9, 2024 issued in the corresponding Chinese Patent Application No. 202210172443.3 with the English machine translation thereof.

* cited by examiner

METHOD OF SELECTING ADHESIVE AND POWER GENERATION CELL

CROSS-REFERENCE TO RELATED APPLICATIONS

This application is based upon and claims the benefit of priority from Japanese Patent Application No. 2021-046204 filed on Mar. 19, 2021, the contents of which are incorporated herein by reference.

BACKGROUND OF THE INVENTION

Field of the Invention

The present invention relates to a method of selecting an adhesive and a power generation cell.

Description of the Related Art

For example, JP 2017-111962 A discloses an adhesive layer for joining an inner peripheral portion of a resin frame member and an outer peripheral portion of an electrolyte membrane in a resin frame equipped membrane electrode assembly (MEA). The adhesive layer is a thermoplastic resin adhesive (hot-melt adhesive).

SUMMARY OF THE INVENTION

The power generation cell has fluid flow paths through which fluids such as a reactant gas for power generation or a coolant flow. The reactant gas is an oxygen-containing gas or a fuel gas. In such a power generation cell, the thermoplastic resin adhesive may be exposed to the fluid flow paths. In this case, during operation of the power generation cell, the adhesive is softened by being exposed to a high-temperature and high-humidity environment. The adhesive may then flow into the fluid flow path. When the adhesive flows into the fluid flow path, a pressure loss of the fluid flowing through the fluid flow path increases, and thus there is a concern that power generation performance may decrease.

An object of the present invention is to solve the above-described problem.

According to an aspect of the present invention, there is provided a method of selecting an adhesive of a thermoplastic resin provided so as to be exposed to a fluid flow path of a power generation cell, the method including: forming a laminate body by sandwiching an adhesive between a first resin film and a second resin film; applying a compressive load to the laminate body in a laminating direction thereof; exposing the laminate body to an environment heated to a predetermined temperature and humidified to a predetermined humidity; measuring a flow amount of the adhesive at a time of exposing the laminate body; and selecting the adhesive having the flow amount that is equal to or less than a predetermined amount, as an adhesive used for the power generation cell.

According to another aspect of the present invention, there is provided a power generation cell including: a resin frame equipped membrane electrode assembly including a membrane electrode assembly and a resin frame member attached to an outer peripheral portion of the membrane electrode assembly so as to protrude outward from the outer peripheral portion, the membrane electrode assembly including an electrolyte membrane and a pair of electrodes disposed on both sides of the electrolyte membrane; and a pair of separators made of metal, disposed on both sides of the resin frame equipped membrane electrode assembly, wherein each of the pair of separators includes: a fluid flow path through which a fluid flows, the fluid being a reactant gas for power generation or a coolant; and a seal bead portion that surrounds the fluid flow path to prevent leakage of the fluid, wherein the seal bead portion is integrally formed with the separator so as to protrude toward the resin frame member, an adhesive layer which is an adhesive of a thermoplastic resin is firmly fixed to one surface of the resin frame member, an inner peripheral portion of the adhesive layer joins an outer peripheral portion of the electrolyte membrane to an inner peripheral portion of the resin frame member, and an outer peripheral portion of the adhesive layer joins a top portion of the seal bead portion to an outer peripheral portion of the resin frame member, and wherein the adhesive is selected by the above-described method of selecting the adhesive.

According to the present invention, a compressive load in the laminating direction is applied to the laminate body including the adhesive and the first resin film and the second resin film sandwiching the adhesive therebetween. Further, the flow amount of the adhesive is measured when the laminate body is exposed to an environment that is heated to a predetermined temperature and humidified to a predetermined humidity. Accordingly, it is possible to easily know the flow amount of the adhesive in an environment close to the environment during operation of the power generation cell. Further, an adhesive whose measured flow amount is equal to or less than a predetermined amount is selected as the adhesive used for the power generation cell. Therefore, it is possible to easily select an adhesive that is not likely to be softened and flow into the fluid flow path during operation of the power generation cell.

In the power generation cell, the adhesive layer, which is the adhesive selected by the above-described method, is firmly fixed to the one surface of the resin frame member. Therefore, even when the top portion of the seal bead portion is brought into contact with the adhesive layer, the adhesive is less likely to flow into the fluid flow path during operation of the power generation cell. As a result, an increase in pressure loss of the fluid flowing through the fluid flow path due to the adhesive can be suppressed, and thus a decrease in power generation performance can be suppressed.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
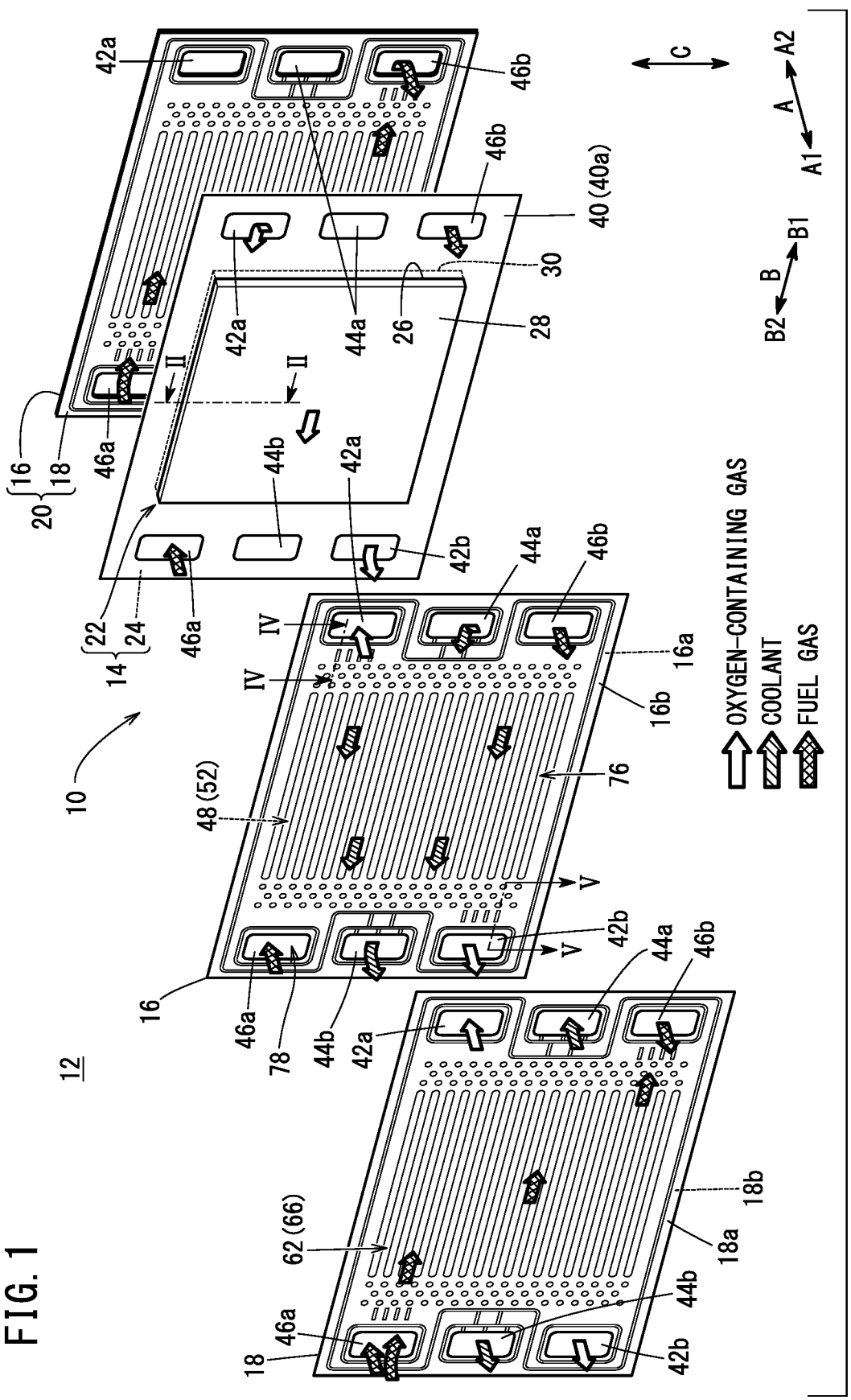
FIG. 1 is a partially-omitted exploded perspective view of a fuel cell stack including an adhesive selected by a method of selecting an adhesive, according to an embodiment of the present invention.

As shown in FIG. 1, a power generation cell 10 is a unit cell of a fuel cell stack 12. The fuel cell stack 12 includes a plurality of the power generation cells 10. The plurality of power generation cells 10 are stacked in the direction of arrow A. The fuel cell stack 12 is mounted on, for example, a fuel cell electric vehicle (not shown) as an in-vehicle fuel cell stack.

The power generation cell 10 has a horizontally long rectangular shape. The power generation cell 10 includes a resin frame equipped MEA 14 (resin frame equipped membrane electrode assembly), a first separator 16, and a second separator 18. The resin frame equipped MEA 14 is disposed between the first separator 16 and the second separator 18.

Each of the first separator 16 and the second separator 18 is formed by press-forming a metal thin plate to have a corrugated shape in cross section. The metal thin plate is, for example, a steel plate, a stainless steel plate, an aluminum plate, or a plated steel plate. The metal thin plate may be a stainless steel plate whose surface is surface-treated for anti-corrosion or an aluminum plate whose surface is surface-treated for anti-corrosion. The first separator 16 and the second separator 18 are joined to each other on a plurality of joining lines (not shown) by a laser welding or the like to form a joint separator 20.

Figure 2:
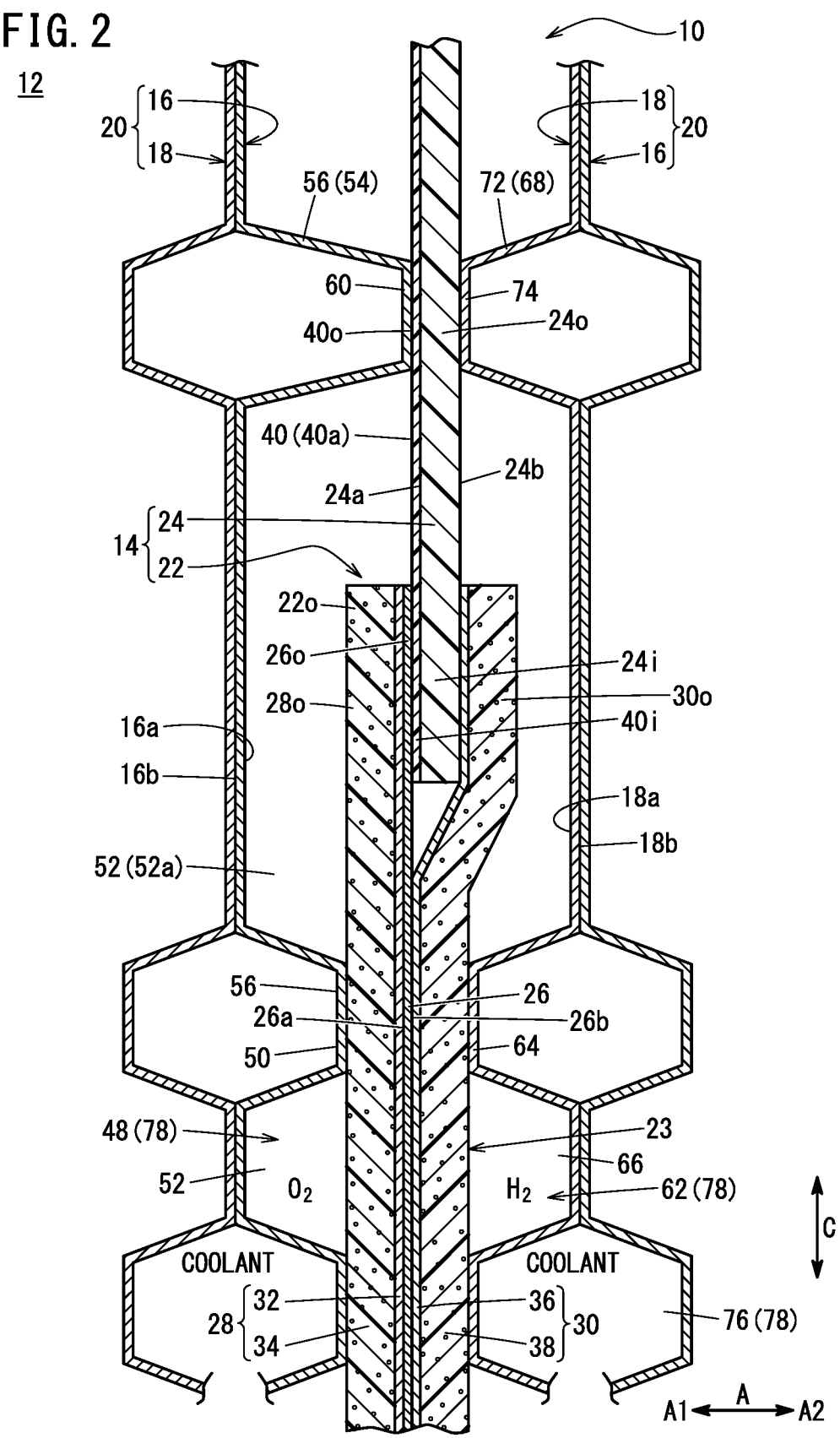
FIG. 2 is a partially-omitted vertical cross-sectional view taken along line II-II of FIG. 1.

In FIGS. 1 and 2, the resin frame equipped MEA 14 includes a MEA 22 (membrane electrode assembly) and a resin frame member 24. The resin frame member 24 is attached to an outer peripheral portion 22o of the MEA 22 so as to protrude outward from the outer peripheral portion 22o.

As shown in FIG. 2, the MEA 22 includes an electrolyte membrane 26, a first electrode 28, and a second electrode 30. The first electrode 28 is disposed on one surface 26a of the electrolyte membrane 26. The second electrode 30 is disposed on the other surface 26b of the electrolyte membrane 26. The electrolyte membrane 26 is, for example, a solid polymer electrolyte membrane (cation exchange membrane). For example, the solid polymer electrolyte membrane is a thin membrane of perfluorosulfonic acid containing water. The electrolyte membrane 26 is sandwiched and held between the first electrode 28 and the second electrode 30. The electrolyte membrane 26 may be a fluorine-based electrolyte or a HC (hydrocarbon)-based electrolyte.

The first electrode 28 includes a first electrode catalyst layer 32 and a first gas diffusion layer 34. The first electrode catalyst layer 32 is joined to one surface 26a of the electrolyte membrane 26. The first gas diffusion layer 34 is laminated on the first electrode catalyst layer 32. The second electrode 30 includes a second electrode catalyst layer 36 and a second gas diffusion layer 38. The second electrode catalyst layer 36 is joined to the other surface 26b of the electrolyte membrane 26. The second gas diffusion layer 38 is laminated on the second electrode catalyst layer 36.

The first electrode catalyst layer 32 includes, for example, porous carbon particles having a platinum alloy supported on the surface thereof. The porous carbon particles are uniformly coated on the surface of the first gas diffusion layer 34 together with ion conductive polymer binder. The second electrode catalyst layer 36 includes, for example, porous carbon particles having a platinum alloy supported on the surface thereof. The porous carbon particles are uniformly coated on the surface of the second gas diffusion layer 38 together with the ion conductive polymer binder. The first gas diffusion layer 34 and the second gas diffusion layer 38 include carbon paper, carbon cloth, or the like.

The resin frame member 24 has an electrical insulating property. Examples of materials of the resin frame member 24 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The resin frame member 24 is a rectangular ring-shaped member (see FIG. 1). An inner peripheral portion 24i of the resin frame member 24 is disposed between an outer peripheral portion 28o of the first electrode 28 and an outer peripheral portion 30o of the second electrode 30. More specifically, the inner peripheral portion 24i of the resin frame member 24 is sandwiched between an outer peripheral portion 26o of the electrolyte membrane 26 and the outer peripheral portion 30o of the second electrode 30. One surface 24a of the resin frame member 24 faces the outer peripheral portion 26o of the electrolyte membrane 26. The other surface 24b of the resin frame member 24 faces the outer peripheral portion 30o of the second electrode 30. The inner peripheral portion 24i of the resin frame member 24 may be sandwiched between the outer peripheral portion 26o of the electrolyte membrane 26 and the outer peripheral portion 28o of the first electrode 28.

An adhesive layer 40, which is a thermoplastic-resin adhesive 40a (hot-melt adhesive), is firmly fixed to one surface 24a (one surface) of the resin frame member 24. The outer peripheral portion 26o of the electrolyte membrane 26 is in contact with the adhesive layer 40. In other words, an inner peripheral portion 40i of the adhesive layer 40 joins the outer peripheral portion 26o of the electrolyte membrane 26 to the inner peripheral portion 24i of the resin frame member 24. The adhesive 40a may be a liquid or a solid. Specific examples of the resin material used as the adhesive 40a include silicone resin-based materials, fluororesin-based materials, epoxy resin-based materials, etc.

As shown in FIG. 1, one end edge portion of each power generation cell 10 in the long-side direction includes an oxygen-containing gas supply passage 42a, a coolant supply passage 44a, and a fuel gas discharge passage 46b. One end edge portion of each power generation cell 10 in the long-side direction is an end edge portion of each power generation cell 10 in the arrow B1 direction. The oxygen-containing gas supply passage 42a, the coolant supply passage 44a, and the fuel gas discharge passage 46b are arranged in the short-side direction of each power generation cell 10. The short side direction of each power generation cell 10 is aligned with the arrow C direction.

An oxygen-containing gas (for example, an oxygen-containing gas), which is one of the reactant gases, flows through the oxygen-containing gas supply passage 42a in the direction of arrow A2. A coolant (for example, pure water, ethylene glycol, oil, or the like) flows through the coolant supply passage 44a in the direction of arrow A2. A fuel gas (for example, a hydrogen-containing gas) which is the other reactant gas flows through the fuel gas discharge passage 46b in the direction of the arrow A1.

The other end edge portion of each power generation cell 10 in the long side direction has a fuel gas supply passage 46a, a coolant discharge passage 44b, and an oxygen-containing gas discharge passage 42b. The other end edge portion of each power generation cell 10 in the long-side direction is an end edge portion of each power generation cell 10 in the direction of arrow B2. The fuel gas supply passage 46a, the coolant discharge passage 44b, and the oxygen-containing gas discharge passage 42b are arranged in the direction indicated by the arrow C.

Fuel gas flows through the fuel gas supply passage 46a in the direction indicated by arrow A2. The coolant flows through the coolant discharge passage 44b in the direction of the arrow A1. The oxygen-containing gas flows through the oxygen-containing gas discharge passage 42b in the direction of the arrow A1.

The number, arrangement, shape, and size of the passages (such as the oxygen-containing gas supply passage 42a) described above are not limited to those in the present embodiment, and may be appropriately set according to required specifications.

Figure 3:
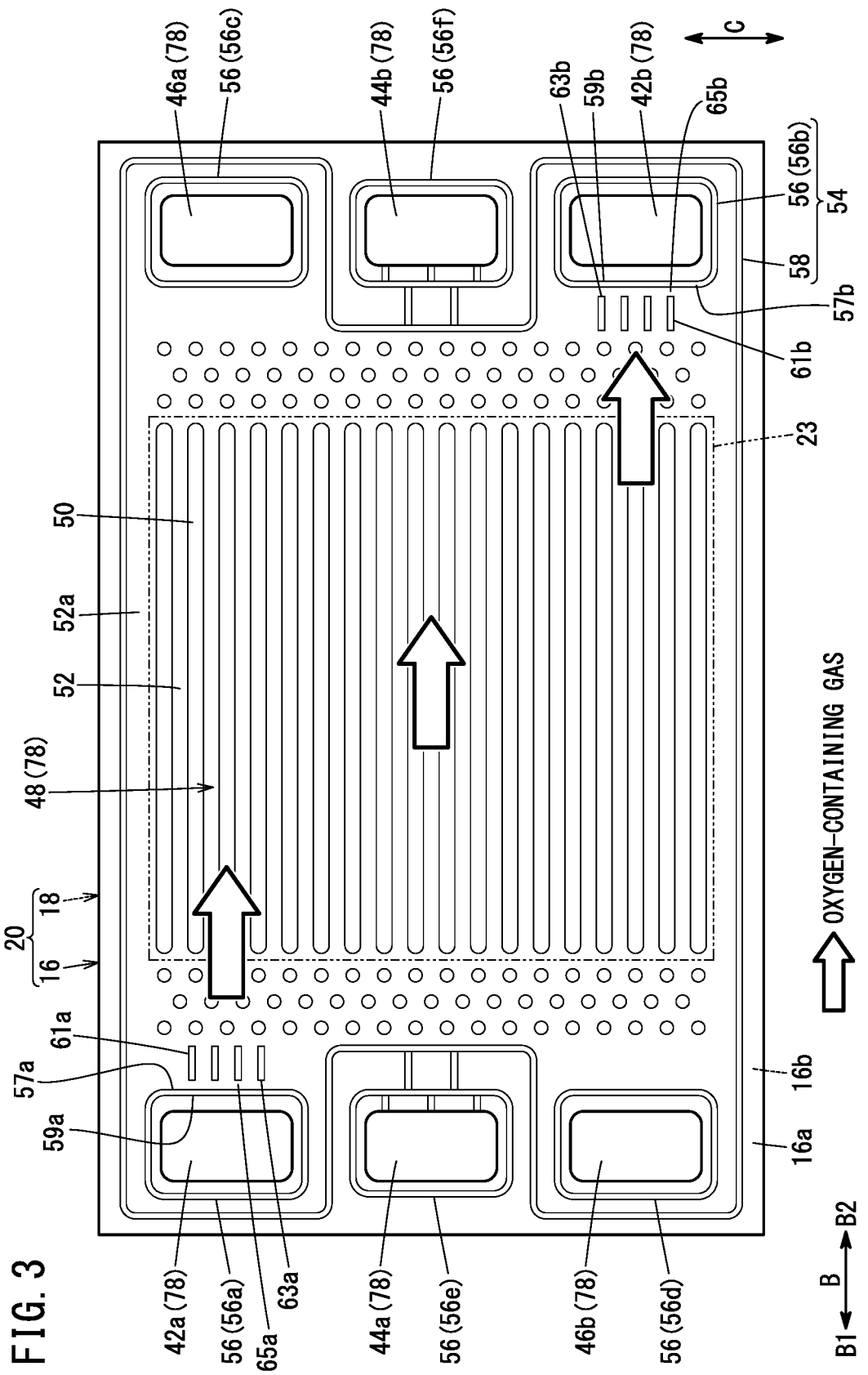
FIG. 3 is a plan view of a joint separator viewed from a first separator toward a second separator.

As shown in FIGS. 2 and 3, the first separator 16 has a rectangular shape. A surface (hereinafter referred to as "surface 16a") of the first separator 16 facing the resin frame equipped MEA 14 has an oxygen-containing gas flow field 48 (reactant gas flow field) extending in the long side direction (arrow B direction) of the power generation cell 10. The oxygen-containing gas flow field 48 is in fluid communication with the oxygen-containing gas supply passage 42a and the oxygen-containing gas discharge passage 42b. The oxygen-containing gas flow field 48 supplies an oxygen-containing gas to the first electrode 28.

The oxygen-containing gas flow field 48 includes a plurality of first flow grooves 52. Each of the first flow grooves 52 is located between a plurality of first flow field protrusions 50 extending in the direction of arrow B. That is, in the oxygen-containing gas flow field 48, the first flow field protrusion 50 and the first flow groove 52 are alternately arranged in the flow field width direction (the direction of arrow C). The first flow field protrusions 50 and the first flow grooves 52 are integrally formed with the first separator 16 by press forming. The first flow field protrusions 50 and the first flow grooves 52 extend linearly in the direction of arrow B. However, the first flow field protrusions 50 and the first flow grooves 52 may extend in a wave shape in the arrow B direction.

In FIG. 2, the cross-sectional shape of the first flow field protrusion 50 is a trapezoidal shape. That is, the cross-sectional shape of the first flow field protrusion 50 is tapered toward the protruding direction of the first flow field protrusion 50. The cross-sectional shape of the first flow field protrusion 50 may be rectangular.

In FIG. 3, the surface 16a of the first separator 16 is provided with a first seal bead portion 54 for preventing leakage of fluid which is a reactant gas (oxygen-containing gas or fuel gas) or a coolant. The first seal bead portion 54 extends straight as viewed in the separator thickness direction (direction indicated by the arrow A). However, the first seal bead portion 54 may extend in a wavy shape when viewed from the separator thickness direction (stacking direction).

Figure 4:
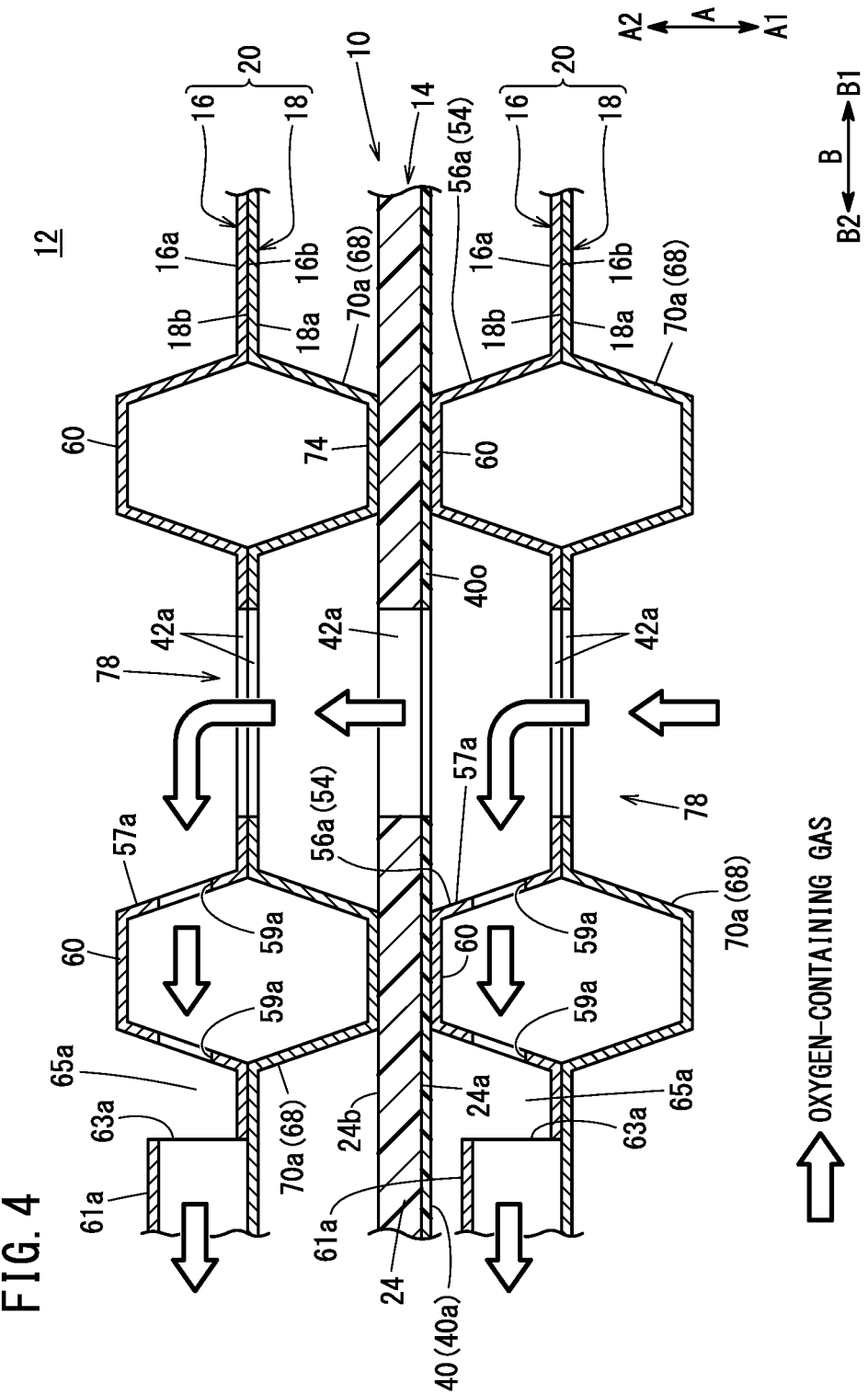
FIG. 4 is a partially-omitted cross-sectional view taken along line IV-IV of FIG. 1.
Figure 5:
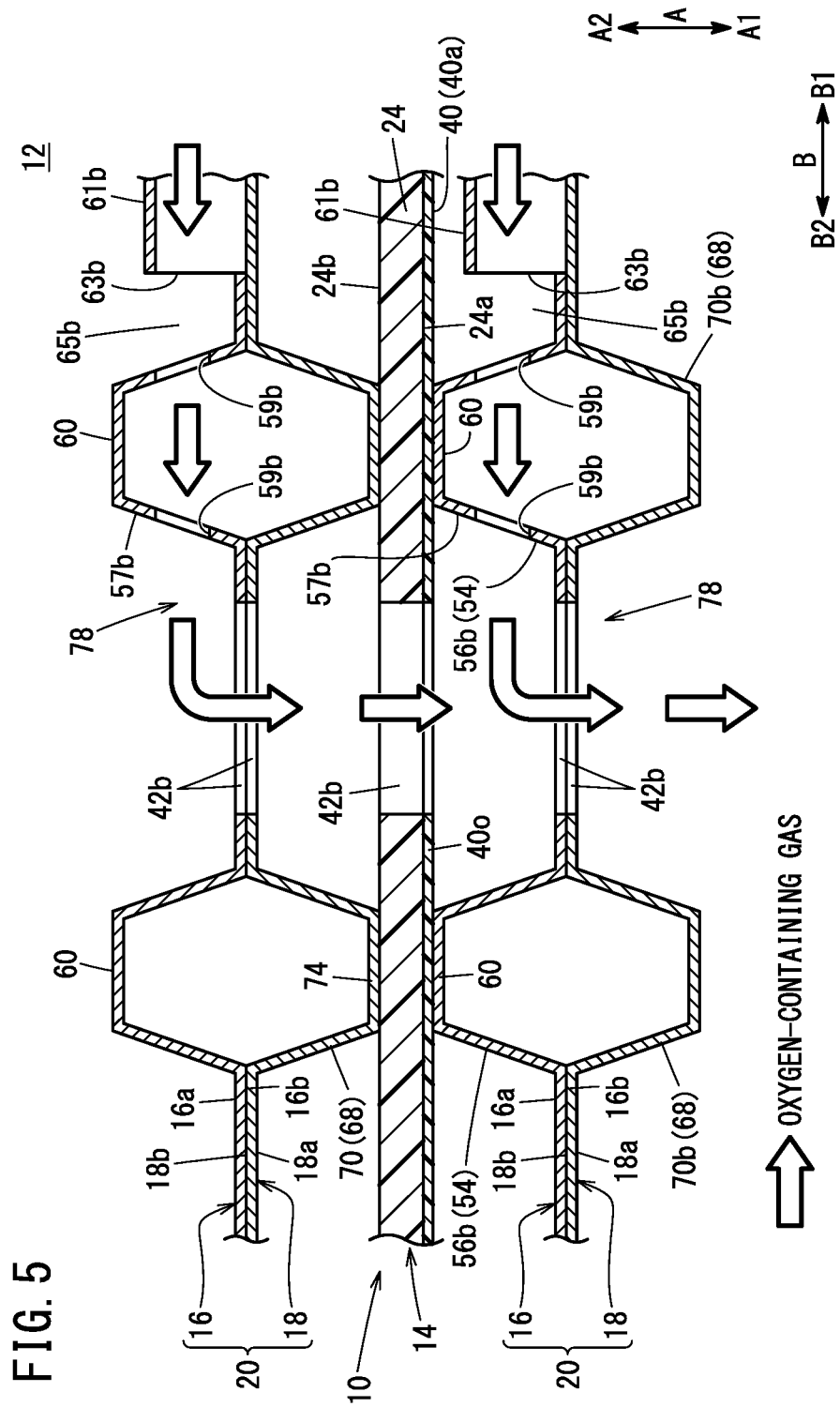
FIG. 5 is a partially-omitted cross-sectional view taken along line V-V of FIG. 1.

As shown in FIGS. 2, 4, and 5, the first seal bead portion 54 is integrally formed with the first separator 16 so as to project toward the resin frame equipped MEA 14. The first seal bead portion 54 is elastically deformed by a compressive load in the direction of the arrow A. The first seal bead portion 54 has a trapezoidal cross-sectional shape. That is, the cross-sectional shape of the first seal bead portion 54 is tapered toward the protruding direction of the first seal bead portion 54. The cross-sectional shape of the first seal bead portion 54 may be rectangular.

In FIG. 3, the first seal bead portion 54 includes a plurality of first passage bead portions 56 and a first flow field bead portion 58. The plurality of first passage bead portions 56 respectively surround the plurality of passages (the oxygen-containing gas supply passage 42a and the like). The first flow field bead portion 58 is located on an outer peripheral portion of the first separator 16.

Hereinafter, among the plurality of first passage bead portions 56, a bead portion surrounding the oxygen-containing gas supply passage 42a is referred to as a "first passage bead portion 56a", and a bead portion surrounding the oxygen-containing gas discharge passage 42b is referred to as a "first passage bead portion 56b". Further, among the plurality of first passage bead portions 56, a bead portion surrounding the fuel gas supply passage 46a is referred to as a "first passage bead portion 56c", and a bead portion surrounding the fuel gas discharge passage 46b is referred to as a "first passage bead portion 56d". Further, among the plurality of first passage bead portions 56, a bead portion surrounding the coolant supply passage 44a is referred to as a "first passage bead portion 56e", and a bead portion surrounding the coolant discharge passage 44b is referred to as a "first passage bead portion 56f".

The first flow field bead portion 58 surrounds the oxygen-containing gas flow field 48 and the plurality of first passage bead portions 56a to 56d. The first passage bead portions 56e and 56f are located outside the first flow field bead portion 58. The first flow field bead portion 58 surrounds a power generation area 23 (see FIGS. 2 and 3) on the MEA 22.

As shown in FIGS. 3 and 4, an inner portion 57a of the first passage bead portion 56a that is located between the oxygen-containing gas supply passage 42a and the oxygen-containing gas flow field 48 includes a plurality of first introduction communication channels 59a. The plurality of first introduction communication channels 59a allow the oxygen-containing gas supply passage 42a and the oxygen-containing gas flow field 48 to communicate with each other. A plurality of first introduction guide portions 61a are integrally formed on the surface 16a of the first separator 16. The plurality of first introduction guide portions 61a guide the oxygen-containing gas that has flowed through the first introduction communication channels 59a, to the oxygen-containing gas flow field 48. Each of the first introduction guide portions 61a protrudes from the surface 16a of the first separator 16 toward the resin frame member 24. The first introduction guide portions 61a extend from the first passage bead portion 56a toward the oxygen-containing gas flow field 48.

A first inlet end of the first introduction guide portion 61a close to the first passage bead portion 56a is spaced from the inner portion 57a of the first passage bead portion 56a. That is, there is a slight gap 65*a* between the first inlet end of the first introduction guide portion 61*a* and the inner portion 57*a* of the first passage bead portion 56*a*. A first inlet opening 63*a* facing the first introduction communication channel 59*a* is located at the first inlet end of the first introduction guide portion 61*a*.

As shown in FIGS. 3 and 5, an inner portion 57*b* of the first passage bead portion 56*b* that is located between the oxygen-containing gas discharge passage 42*b* and the oxygen-containing gas flow field 48 includes a plurality of first discharge communication channels 59*b*. The plurality of first discharge communication channels 59*b* allow the oxygen-containing gas discharge passage 42*b* and the oxygen-containing gas flow field 48 to communicate with each other. A plurality of first discharge guide portions 61*b* are integrally formed on the surface 16*a* of the first separator 16. The first discharge guide portions 61*b* guide the oxygen-containing gas (oxygen-containing exhaust gas) that has flowed through the oxygen-containing gas flow field 48 to the first discharge communication channels 59*b*. Each first discharge guide portion 61*b* protrudes from the surface 16*a* of the first separator 16 toward the resin frame member 24. The first discharge guide portions 61*b* extend from the oxygen-containing gas flow field 48 toward the inner portion 57*b* of the first passage bead portion 56*b*.

A first outlet end of the first discharge guide portion 61*b* close to the first passage bead portion 56*b* is spaced from the inner portion 57*b* of the first passage bead portion 56*b*. That is, there is a slight gap 65*b* between the first outlet end of the first discharge guide portion 61*b* and the inner portion 57*b* of the first passage bead portion 56*b*. A first outlet opening 63*b* facing the first discharge communication channel 59*b* is located at the first outlet end of the first discharge guide portion 61*b*.

As shown in FIGS. 2, 4, and 5, top portions 60 of the first seal bead portion 54 (the first passage bead portions 56 and the first flow field bead portion 58) are in contact with the adhesive layer 40. In other words, the top portions 60 of the first seal bead portion 54 (the first passage bead portions 56 and the first flow field bead portion 58) are joined to an outer peripheral portion 24*o* of the resin frame member 24 by an outer peripheral portion 40*o* of the adhesive layer 40. A rubber seal layer (not shown) may be provided between each top portion 60 and the adhesive layer 40. The thickness of the rubber seal layer is greater than the thickness of the adhesive layer 40.

The adhesive 40*a* is exposed to the oxygen-containing gas flow field 48 (more specifically, to a first flow groove 52*a* located at the end in the direction of arrow C among the plurality of first flow grooves 52) (see FIG. 2). The adhesive 40*a* is also exposed to the oxygen-containing gas supply passage 42*a*, the oxygen-containing gas discharge passage 42*b*, the coolant supply passage 44*a*, the coolant discharge passage 44*b*, the fuel gas supply passage 46*a*, and the fuel gas discharge passage 46*b* (see FIGS. 4 and 5).

Figure 6:
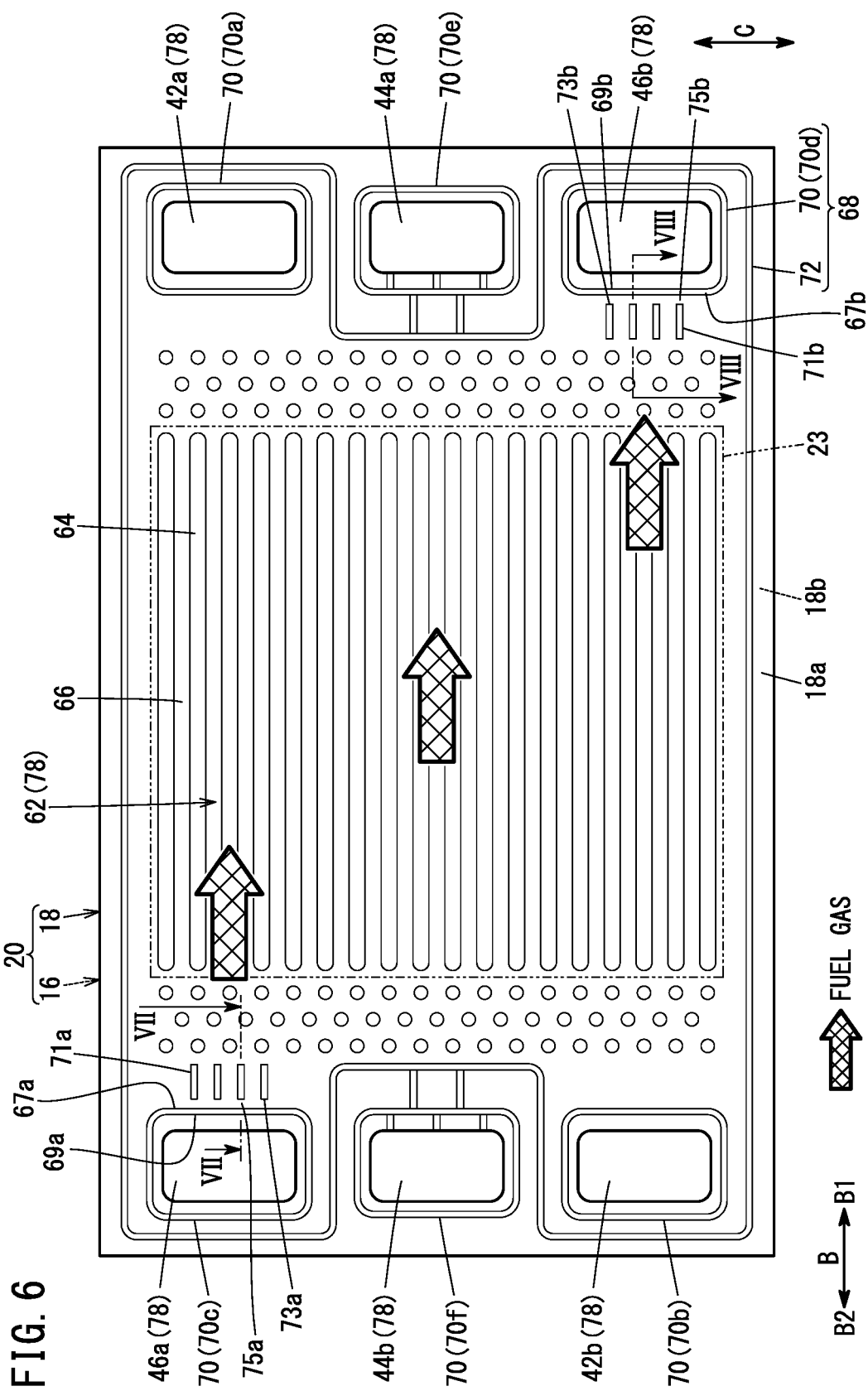
FIG. 6 is a plan view of the joint separator viewed from the second separator toward the first separator.

As shown in FIGS. 2 and 6, the second separator 18 has a rectangular shape. A surface (hereinafter referred to as "surface 18*a*") of the second separator 18 facing the resin frame equipped MEA 14 has a fuel gas flow field 62 (reactant gas flow field) extending in the long side direction (arrow B direction) of the power generation cell 10. The fuel gas flow field 62 is in fluid communication with the fuel gas supply passage 46*a* and the fuel gas discharge passage 46*b*. The fuel gas flow field 62 supplies fuel gas to the second electrode 30.

The fuel gas flow field 62 has a plurality of second flow grooves 66. Each of the second flow grooves 66 is located between two adjacent grooves of a plurality of second flow field protrusions 64 extending in the direction of arrow B. That is, in the fuel gas flow field 62, the second flow field protrusion 64 and the second flow groove 66 are alternately arranged in the flow path width direction (arrow C direction). The plurality of second flow field protrusions 64 and the plurality of second flow grooves 66 are integrally formed with the second separator 18 by press forming. The second flow field protrusions 64 and the second flow grooves 66 extend linearly in the direction of arrow B. However, the second flow field protrusions 64 and the second flow grooves 66 may extend in a wavy shape in the arrow B direction.

In FIG. 2, the cross-sectional shape of the second flow field protrusion 64 is a trapezoidal shape. That is, the cross-sectional shape of the second flow field protrusion 64 is tapered toward the protruding direction of the second flow field protrusion 64. The cross-sectional shape of the second flow field protrusion 64 may be rectangular.

In FIG. 6, the surface 18*a* of the second separator 18 is provided with a second seal bead portion 68 for preventing leakage of fluid such as a reactant gas (oxygen-containing gas or fuel gas) or a coolant. The second seal bead portion 68 extends straight as viewed in the separator thickness direction (direction indicated by the arrow A). However, the second seal bead portion 68 may extend in a wavy shape when viewed from the separator thickness direction (stacking direction).

Figure 7:
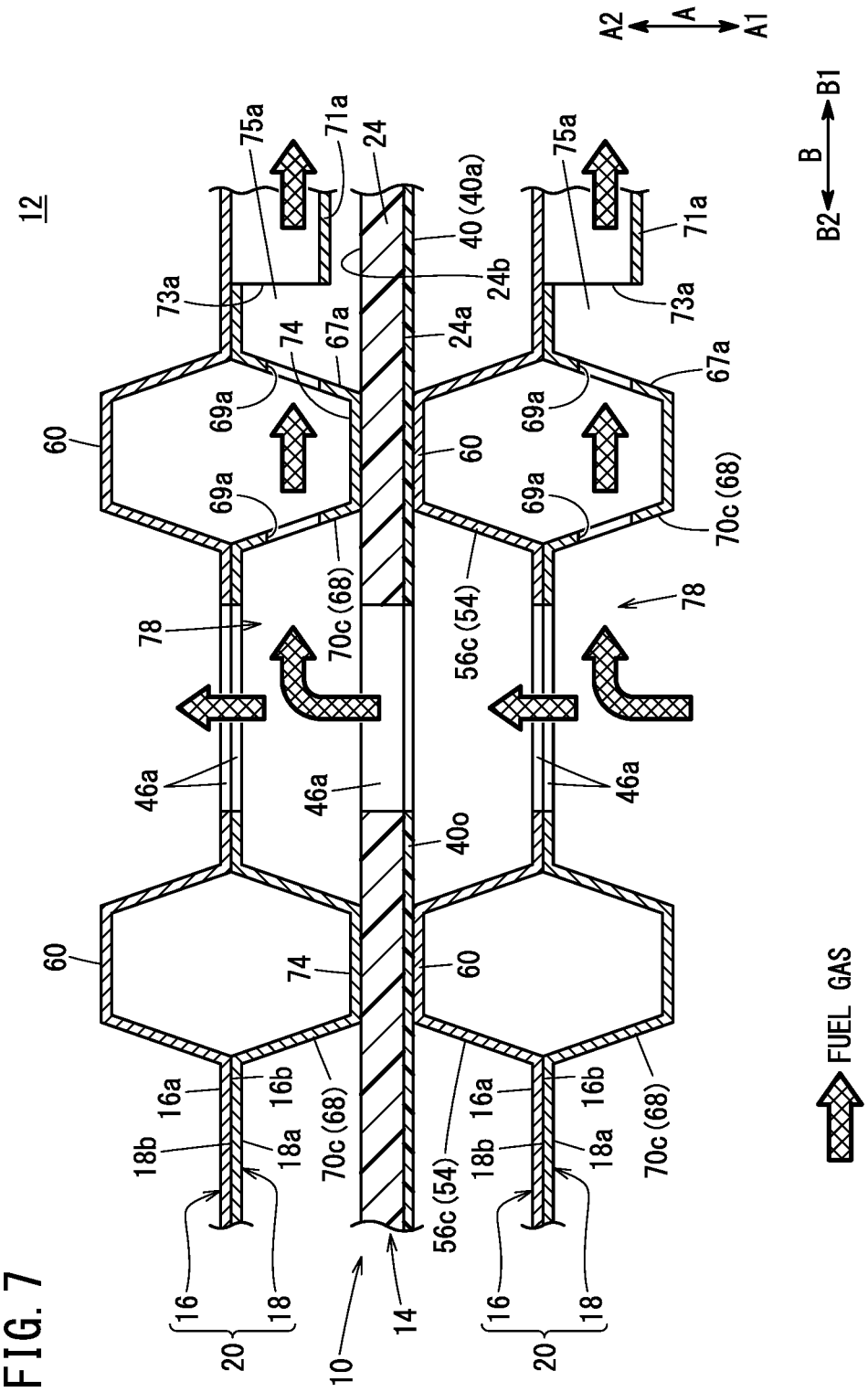
FIG. 7 is a partially-omitted vertical cross-sectional view taken along line VII-VII of FIG. 6.
Figure 8:
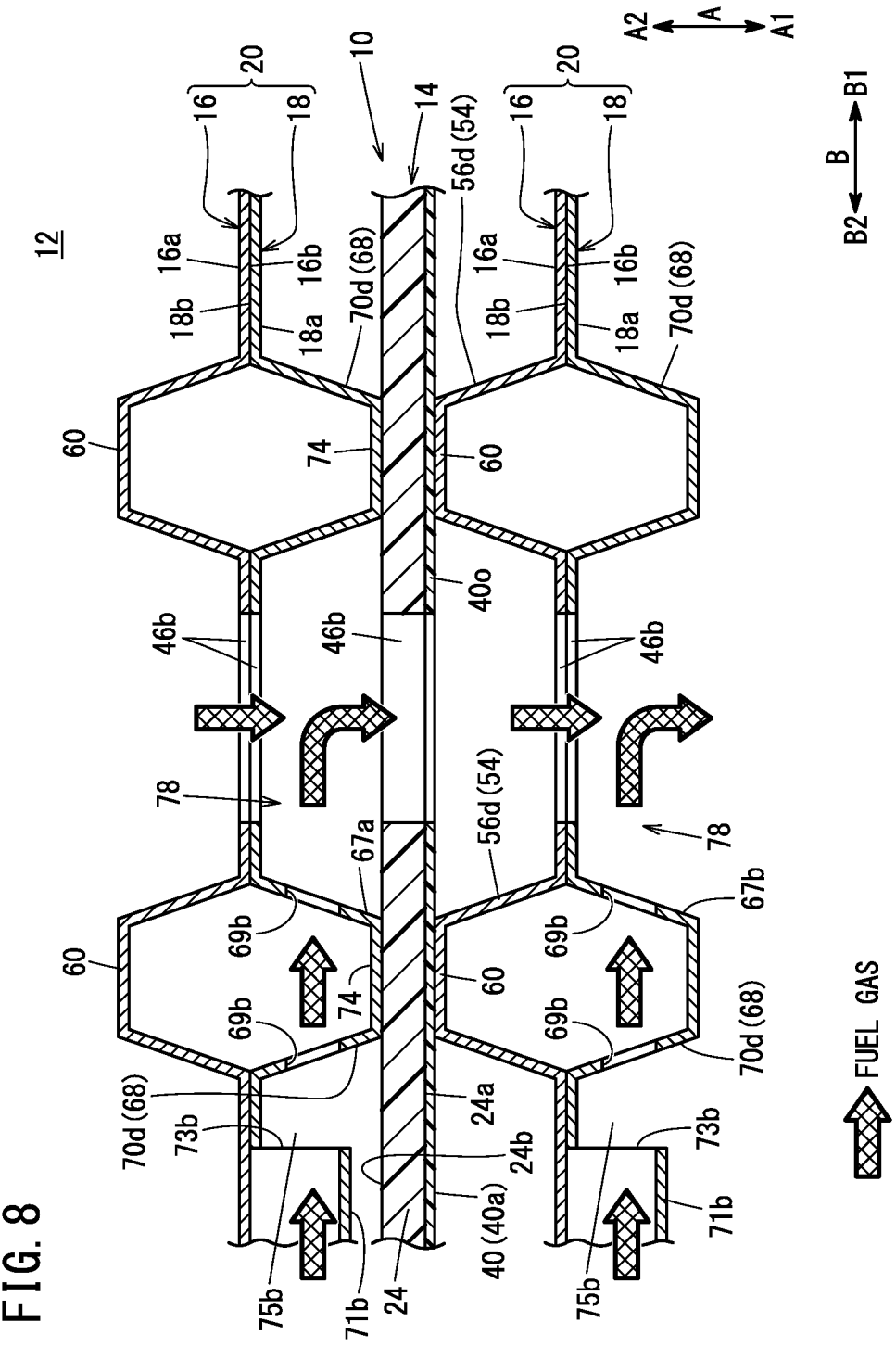
FIG. 8 is a partially-omitted cross-sectional view taken along line VIII-VIII of FIG. 6.

As shown in FIGS. 2, 7, and 8, the second seal bead portion 68 is integrally formed with the second separator 18 so as to project toward the resin frame equipped MEA 14. The second seal bead portion 68 is elastically deformed by a compressive load in the direction of the arrow A. The second seal bead portion 68 has a trapezoidal cross-sectional shape. That is, the cross-sectional shape of the second seal bead portion 68 is tapered toward the protruding direction of the second seal bead portion 68. Note that the cross-sectional shape of the second seal bead portion 68 may be rectangular.

In FIG. 6, the second seal bead portion 68 includes a plurality of second passage bead portions 70 and a second flow field bead portion 72. The plurality of second passage bead portions 70 respectively surround the plurality of passages (the oxygen-containing gas supply passage 42*a* and the like). The second flow field bead portion 72 is located on an outer peripheral portion of the second separator 18. The second seal bead portion 68 overlaps the first seal bead portion 54 when viewed from the separator thickness direction (stacking direction) (see FIGS. 2, 4, 5, 7, and 8).

Hereinafter, among the plurality of second passage bead portions 70, a bead portion surrounding the oxygen-containing gas supply passage 42*a* is referred to as a "second passage bead portion 70*a*", and a bead portion surrounding the oxygen-containing gas discharge passage 42*b* is referred to as a "second passage bead portion 70*b*". Further, among the plurality of second passage bead portions 70, a bead portion surrounding the fuel gas supply passage 46*a* is referred to as a "second passage bead portion 70*c*", and a bead portion surrounding the fuel gas discharge passage 46*b* is referred to as a "second passage bead portion 70*d*". Further, among the plurality of second passage bead portions 70, a bead portion surrounding the coolant supply passage 44*a* is referred to as a "second passage bead portion 70*e*", and a bead portion surrounding the coolant discharge passage 44*b* is referred to as a "second passage bead portion 70*f*".

The second flow field bead portion 72 surrounds the fuel gas flow field 62 and the plurality of second passage bead portions 70a to 70d. The second passage bead portions 70e and 70f are located outside the second flow field bead portion 72. The second flow field bead portion 72 surrounds the power generation area 23 (see FIGS. 2 and 6).

As shown in FIGS. 6 and 7, an inner portion 67a of the second passage bead portion 70c located between the fuel gas supply passage 46a and the fuel gas flow field 62 has a plurality of second introduction communication channels 69a. The second introduction communication channels 69a allow the fuel gas supply passage 46a and the fuel gas flow field 62 to communicate with each other. A plurality of second introduction guide portions 71a are integrally formed on the surface 18a of the second separator 18. The plurality of second introduction guide portions 71a guide the fuel gas that has flowed through each second introduction communication channel 69a, to the fuel gas flow field 62. Each second introduction communication channel 69a protrudes from the surface 18a of the second separator 18 toward the resin frame member 24. The second introduction guide portion 71a extends from the second passage bead portion 70c toward the fuel gas flow field 62.

A second inlet end of the second introduction guide portion 71a close to the second passage bead portion 70c is spaced from an inner portion 67a of the second passage bead portion 70c. That is, there is a slight gap 75a between the second inlet end of the second introduction guide portion 71a and the inner portion 67a of the second passage bead portion 70c. A second inlet opening 73a facing the second introduction communication channel 69a is located at the second inlet end of the second introduction guide portion 71a.

As shown in FIGS. 6 and 8, an inner portion 67b of the second passage bead portion 70d located between the fuel gas discharge passage 46b and the fuel gas flow field 62 has a plurality of second discharge communication channels 69b. The second discharge communication channels 69b allow the fuel gas discharge passage 46b and the fuel gas flow field 62 to communicate with each other. A plurality of second discharge guide portions 71b are integrally formed on the surface 18a of the second separator 18. The plurality of second discharge guide portions 71b lead the fuel gas (fuel exhaust gas) that has flowed through the fuel gas flow field 62 to the respective second discharge communication channels 69b. Each of the second discharge guide portions 71b protrudes from the surface 18a of the second separator 18 toward the resin frame member 24. The second discharge guide portions 71b extend from the fuel gas flow field 62 toward the inner portion 67b of the second passage bead portion 70d.

A second outlet end of the second discharge guide portion 71b close to the second passage bead portion 70d is spaced from the inner portion 67b of the second passage bead portion 70d. That is, there is a slight gap 75b between the second outlet end of the second discharge guide portion 71b and the inner portion 67b of the second passage bead portion 70d. A second outlet opening 73b facing the second discharge communication channel 69b is located at the second outlet end of the second discharge guide portion 71b.

As shown in FIGS. 2, 7, and 8, a top portion 74 of the second seal bead portion 68 (the second passage bead portion 70 and the second flow field bead portion 72) is in contact with the other surface 24b of the resin frame member 24. A rubber seal layer (not shown) may be provided between the top portion 74 and the other surface 24b of the resin frame member 24.

As shown in FIG. 1, a coolant flow field 76 is located between the surface 16b of the first separator 16 and a surface 18b of the second separator 18 which are joined to each other. The coolant flow field 76 is in fluid communication with the coolant supply passage 44a and the coolant discharge passage 44b. The coolant flow field 76 is formed by overlapping together the rear surface shape of the first separator 16 on which the oxygen-containing gas flow field 48 is formed, and the rear surface shape of the second separator 18 on which the fuel gas flow field 62 is formed.

In the above-described fuel cell stack 12, a fluid flow path 78 includes the oxygen-containing gas supply passage 42a, the oxygen-containing gas flow field 48, the oxygen-containing gas discharge passage 42b, the fuel gas supply passage 46a, the fuel gas flow field 62, the fuel gas discharge passage 46b, the coolant supply passage 44a, the coolant flow field 76, and the coolant discharge passage 44b. In the fluid flow path 78, fluid such as a reactant gas for power generation (an oxygen-containing gas and a fuel gas) or a coolant flows.

The power generation cell 10 configured as described above operates as follows.

First, as shown in FIG. 1, the oxygen-containing gas is supplied to the oxygen-containing gas supply passage 42a. The fuel gas is supplied to the fuel gas supply passage 46a. The coolant is supplied to the coolant supply passage 44a.

The oxygen-containing gas is introduced into the oxygen-containing gas flow field 48 of the first separator 16 through the oxygen-containing gas supply passage 42a. Thereafter, the oxygen-containing gas flows in the direction of arrow B along the oxygen-containing gas flow field 48 and is supplied to the first electrode 28 of the MEA 22.

In the meanwhile, the fuel gas flows from the fuel gas supply passage 46a into the fuel gas flow field 62 of the second separator 18. Thereafter, the fuel gas flows in the direction of arrow B along the fuel gas flow field 62 and is supplied to the second electrode 30 of the MEA 22.

Therefore, in each MEA 22, the oxygen-containing gas supplied to the first electrode 28 and the fuel gas supplied to the second electrode 30 are consumed by the electrochemical reaction in the first electrode catalyst layer 32 and the second electrode catalyst layer 36. As a result, power generation is performed.

Next, as shown in FIG. 1, the oxygen-containing gas supplied to and consumed by the first electrode 28 flows from the oxygen-containing gas flow field 48 to the oxygen-containing gas discharge passage 42b. Thereafter, the oxygen-containing gas is discharged along the oxygen-containing gas discharge passage 42b in the direction of the arrow A1. Similarly, the fuel gas supplied to and consumed in the second electrode 30 flows from the fuel gas flow field 62 to the fuel gas discharge passage 46b. Thereafter, the fuel gas is discharged along the fuel gas discharge passage 46b in the direction of the arrow A1.

The coolant supplied to the coolant supply passage 44a is introduced into the coolant flow field 76 formed between the first separator 16 and the second separator 18. The coolant flows in the direction of arrow B after being introduced into the coolant flow field 76. After cooling the MEA 22, the coolant is discharged from the coolant discharge passage 44b.

In the power generation cell 10 as described above, the adhesive 40a of the adhesive layer 40 firmly fixed to one surface of the resin frame member 24 is exposed to relatively high temperature and high humidity during operation of the power generation cell 10. Therefore, the adhesive 40a is softened. The softened adhesive 40a may flow into the fluid flow path 78. To be specific, the softened adhesive 40a may flow into the gap 65a and the gap 65b, for example. The gap 65a is located between the inner portion 57a of the first passage bead portion 56a and the first inlet end of the first introduction guide portion 61a. The gap 65b is located between the inner portion 57b of the first passage bead portion 56b and the first outlet end of the first discharge guide portion 61b. In this case, there is a possibility that the first introduction communication channel 59a, the first inlet opening 63a, the first discharge communication channel 59b, and the first outlet opening 63b are blocked by the adhesive 40a. In this case, the pressure loss of fluid flowing through the fluid flow path 78 increases, and thus the power generation performance decreases. In order to suppress such an increase in the pressure loss of the fluid flow path 78, it is necessary to appropriately select an adhesive 40a that is difficult to flow during operation of the power generation cell 10.

Next, how to select the adhesive 40a of the power generation cell 10 will be described. The adhesive 40a is exposed to the fluid flow path 78.

Figure 9:
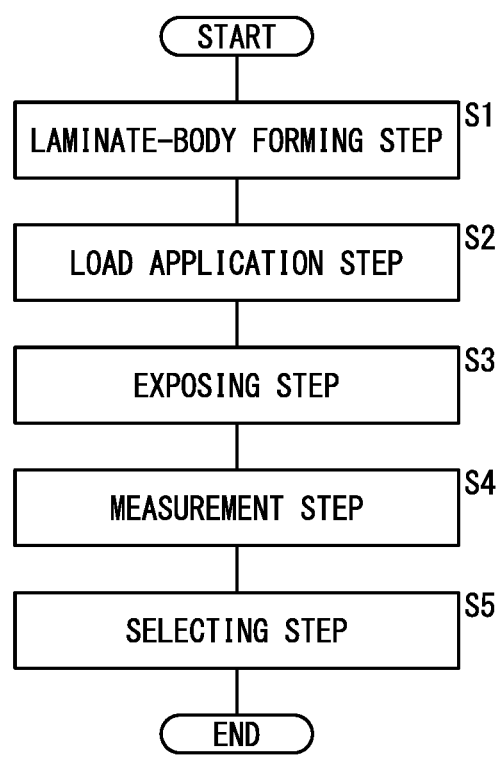
FIG. 9 is a flowchart illustrating a method of selecting an adhesive used in the power generation cell of FIG. 1.

As shown in FIG. 9, the process of selecting the adhesive 40a includes a laminate-body forming step, a load application step, an exposing step, a measurement step, and a selecting step.

Figure 10:
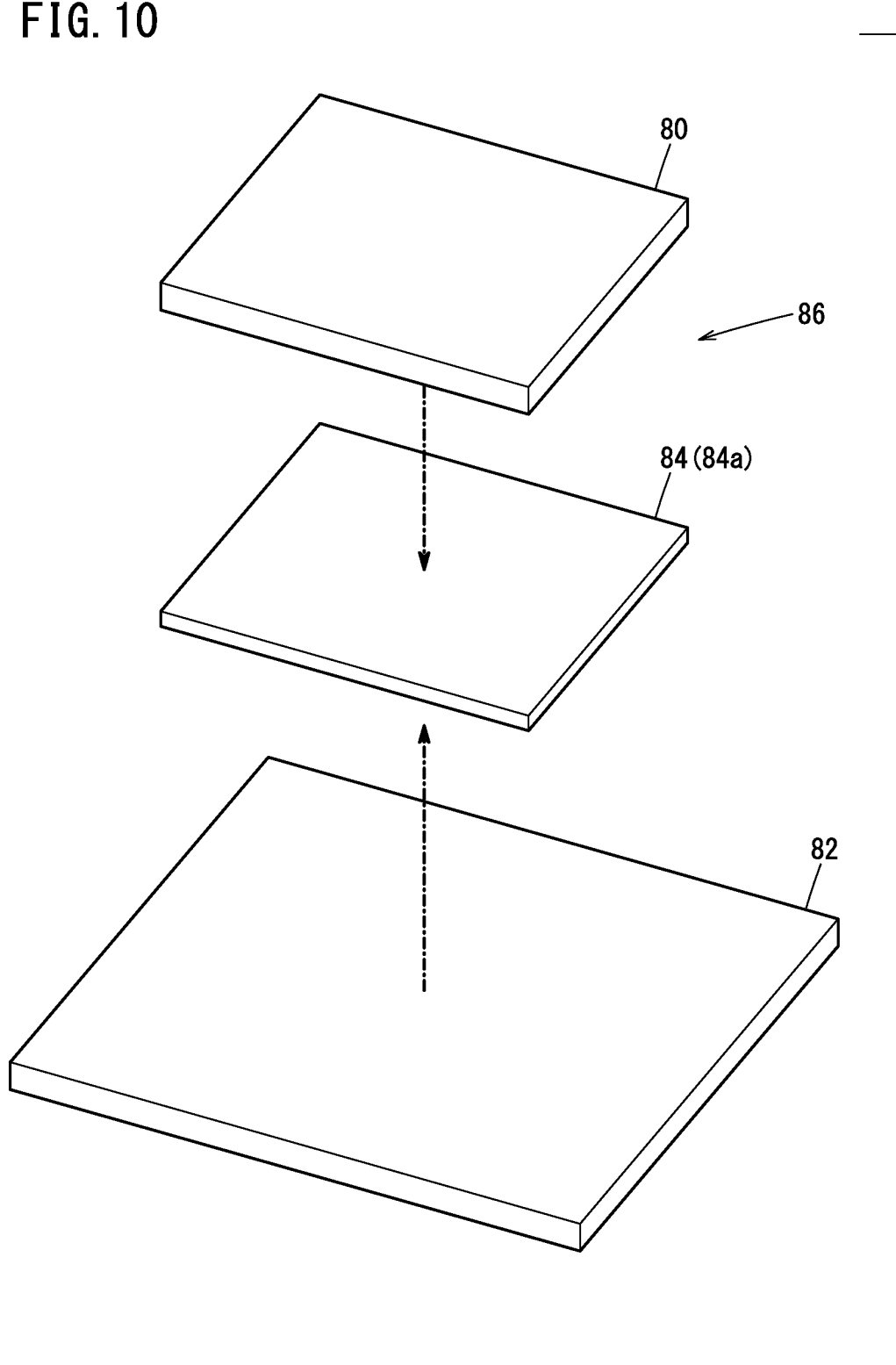
FIG. 10 is an explanatory view of a laminate-body forming step.

In the laminate-body forming step (step S1), as shown in FIG. 10, an adhesive sheet 84 serving as an adhesive 84a is sandwiched between a first resin film 80 and a second resin film 82 to form a laminate body 86. The first resin film 80 and the second resin film 82 are made of, for example, the same resin material as the resin frame member 24 described above. However, the constituent material of the first resin film 80 and the second resin film 82 is not limited to the same resin material as the resin frame member 24, and can be set as appropriate.

The first resin film 80 and the second resin film 82 have a rectangular shape (quadrangular shape). The shape of the first resin film 80 and the second resin film 82 is not limited to a quadrangular shape, and may be a circular shape or a polygonal shape (other than a quadrangular shape). The surface size of the second resin film 82 is larger than the surface size of the first resin film 80.

The adhesive sheet 84 has the same surface size as the first resin film 80. The adhesive 84a may not be formed into a sheet shape in advance. That is, the adhesive 84a may be formed into a sheet shape by applying a liquid adhesive to one surface of the first resin film 80. The adhesive 84a is a thermoplastic resin. Examples of the resin material constituting the adhesive 84a include the same materials as those of the adhesive 40a described above.

Figure 11A:
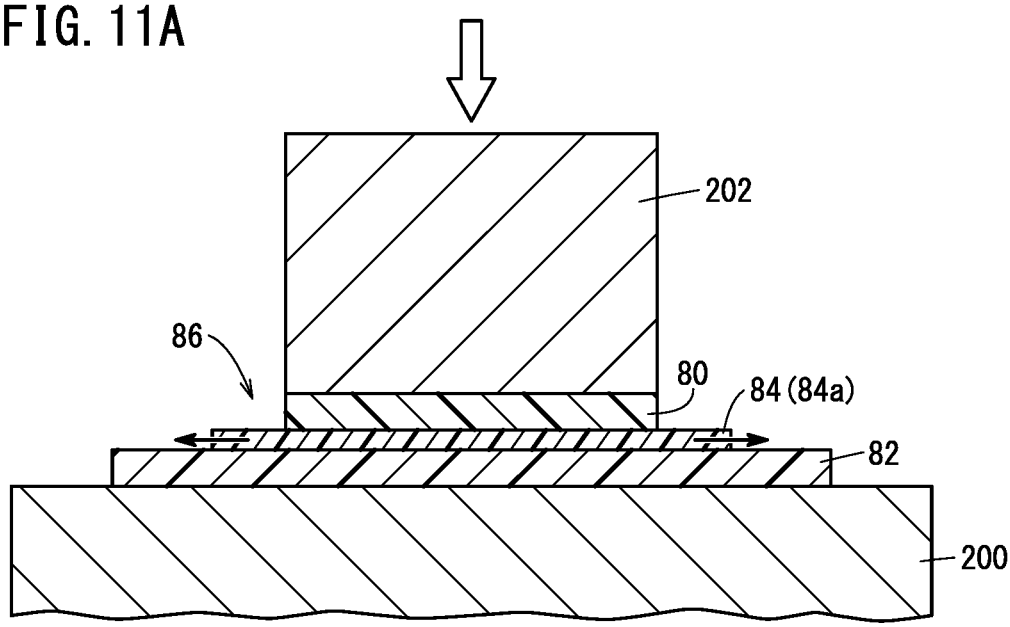
FIG. 11A is an explanatory view of a load application step and an exposing step.

Subsequently, in the load application step (step S2 in FIG. 9), as shown in FIG. 11A, a compressive load in the laminating direction (thickness direction) is applied to the laminate body 86 obtained in the laminate-body forming step. Specifically, in the load application device, the first resin film 80 is pressed toward the second resin film 82 by a pressing member 202 in a state where the second resin film 82 of the laminate body 86 is placed on a placing table 200.

In the exposing step (step S3 in FIG. 9), the laminate body 86 is exposed to an environment heated to a predetermined temperature and humidified to a predetermined humidity. The exposing step is performed simultaneously with the load application step. That is, in the present embodiment, a compressive load is applied to the laminate body 86 in an environment heated to a predetermined temperature and humidified to a predetermined humidity. As a result, the adhesive 84a is softened and flows outward from the first resin film 80. The exposing step may be performed after the load application step is performed.

In the exposing step, the predetermined temperature is set to, for example, a value corresponding to a temperature to which the adhesive 40a is exposed during operation of the power generation cell 10. Specifically, the predetermined temperature is preferably set to, for example, 60° C. or more and 120° C. or less. However, the predetermined temperature may be set to a temperature higher than the temperature to which the adhesive 40a is exposed during operation of the power generation cell 10. For example, the predetermined humidity is set to a value corresponding to a humidity to which the adhesive 40a is exposed during operation of the power generation cell 10. The predetermined humidity is preferably set to, for example, 50% or more and 60% or less. However, the predetermined humidity may be set higher than the humidity to which the adhesive 40a is exposed during the operation of the power generation cell 10.

Figure 11B:
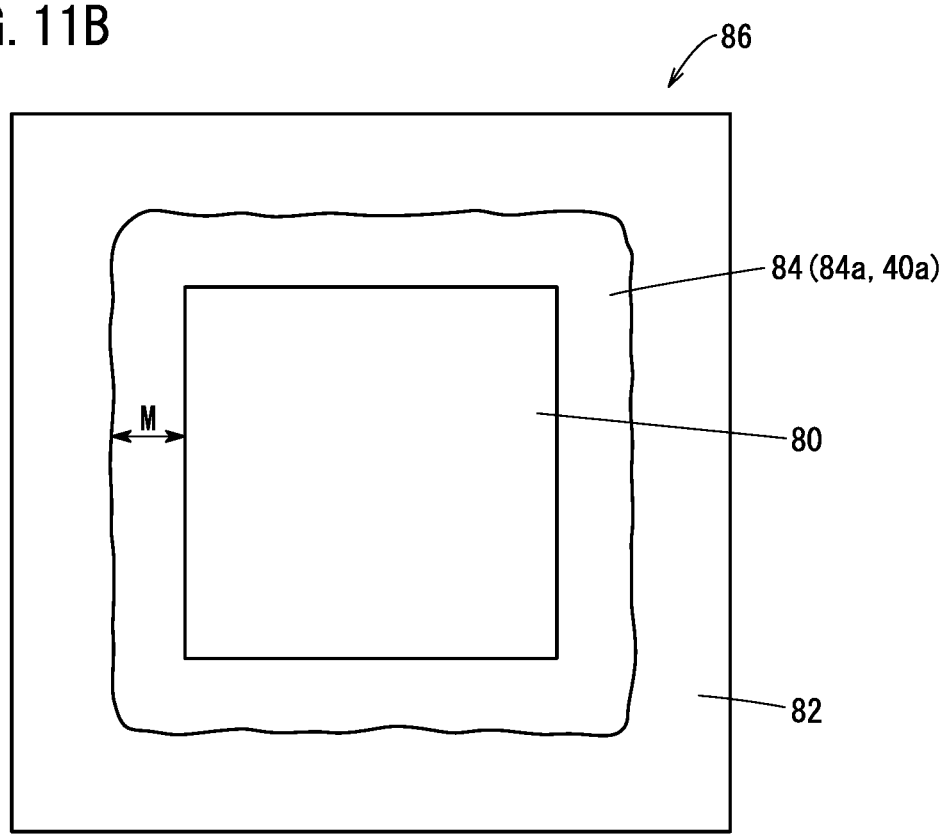
FIG. 11B is an explanatory view of a measurement step.

Subsequently, in the measurement step (step S4 in FIG. 9), as shown in FIG. 11B, the flow amount M of the adhesive 84a during the exposing step is measured. In particular, in the measurement step, the amount of protrusion of the adhesive 84a from the outer periphery of the first resin film 80 (for example, the length of protrusion from each side of the first resin film 80) is measured at a plurality of locations of the laminate body 86, and the average value of the protrusion amounts is taken as the flow amount M of the adhesive 84a.

The flow amount M of the adhesive 84a may be defined as appropriate. That is, in the measurement step, the maximum protruding length of the adhesive 84a from the outer periphery of the first resin film 80 may be measured as the flow amount M of the adhesive 84a. Further, in the measurement step, the volume of the adhesive 84a protruding from the outer periphery of the first resin film 80 may be measured as the flow amount M of the adhesive 84a. Further, in the measurement step, the area of the adhesive 84a protruding from the outer periphery of the first resin film 80 (the area of the adhesive 84a protruding from the outer periphery of the first resin film 80 when the laminate body 86 is viewed from the laminating direction) may be measured as the flow amount M of the adhesive 84a.

Figure 12:
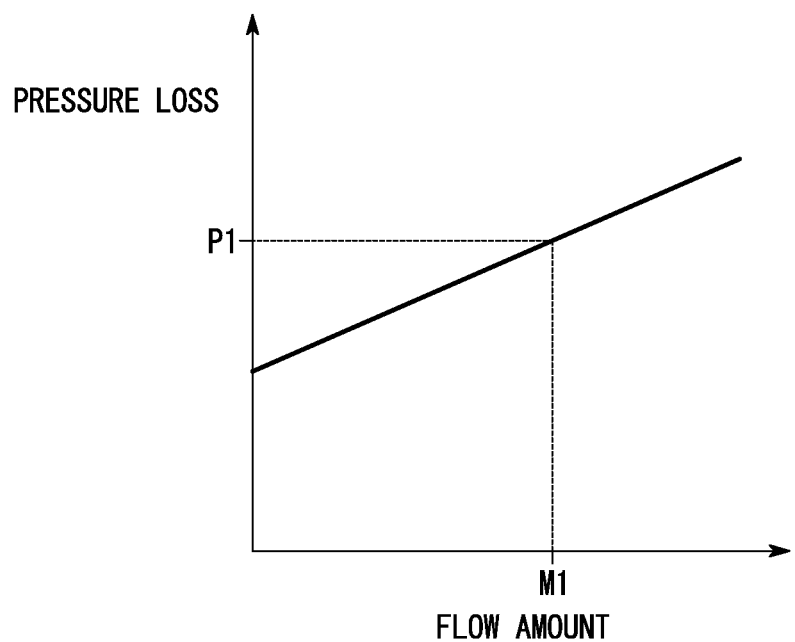
FIG. 12 is a graph showing the relationship between a flow amount of the adhesive and a pressure loss.

Thereafter, in the selecting step (step S5 in FIG. 9), it is determined whether or not the flow amount M of the adhesive 84a measured in the measurement step is equal to or less than a predetermined amount M1. In this selecting step, the adhesive 84a whose flow amount M is equal to or less than the predetermined amount M1 is selected as the adhesive 40a used for the power generation cell 10. Here, as shown in FIG. 12, the predetermined amount M1 is set to a flow amount such that the pressure loss of fluid due to the adhesive 40a flowing into the fluid flow path 78 from the resin frame member 24 during operation of the power generation cell 10 becomes an allowable upper limit value P1.

The allowable upper limit P1 of the pressure loss refers to, for example, an upper limit of the pressure loss that does not affect the power generation performance of the power generation cell 10 when fluid (the fuel gas, the oxygen-containing gas, and the coolant) flows through the fluid flow path 78 at a specific flow rate. The specific flow rate is a flow rate required when the power generation cell 10 is operated so that the current density (electric current per area) of MEA 22 is kept at a predetermined value (for example, 2.5 A/cm$^2$). The phrase "does not affect the power generation performance of the power generation cell 10" includes also a case where the influence on the power generation performance of the power generation cell 10 is negligibly small. When the selecting step is completed, a series of operation flow of the method of selecting the adhesive 40a ends.

Figure 13:
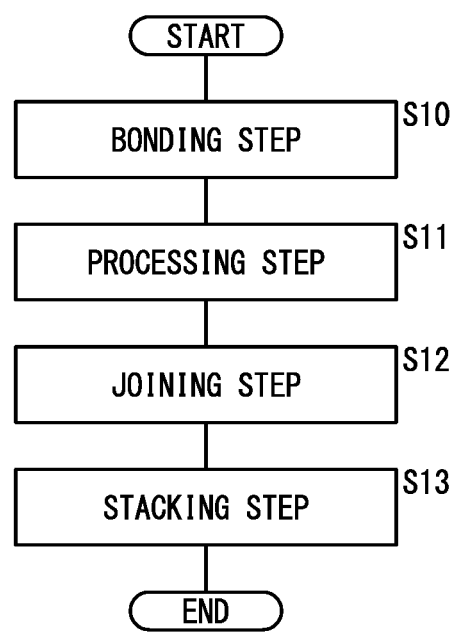
FIG. 13 is a flowchart illustrating a method of manufacturing the fuel cell stack shown in FIG. 1.

Next, a method of manufacturing the above-described fuel cell stack 12 (power generation cell 10) will be described. As shown in FIG. 13, the method of manufacturing the fuel cell stack 12 includes a bonding step, a processing step, a joining step, and a stacking step.

Figure 14A:
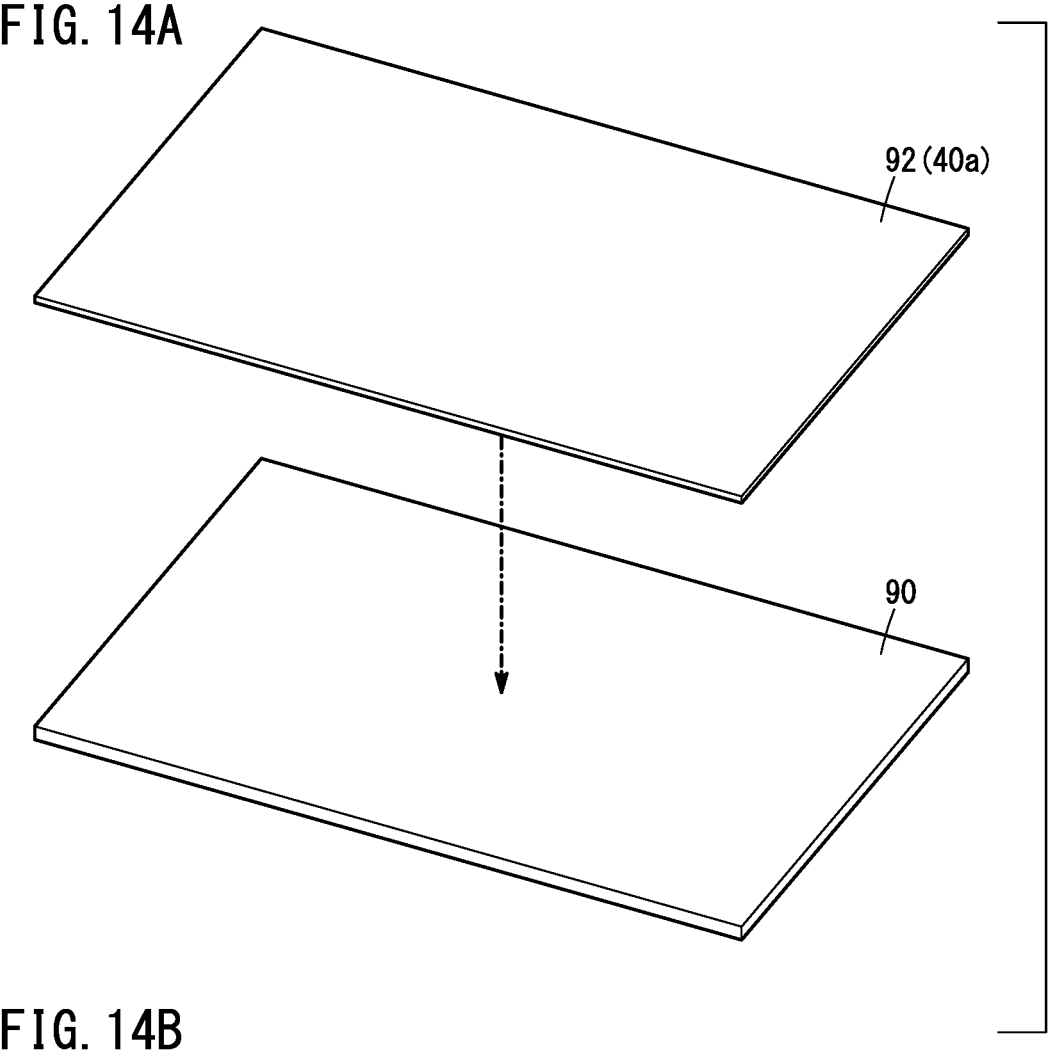
FIG. 14A is an explanatory view of a bonding step.

In the bonding step (step S10), as shown in FIG. 14A, an adhesive sheet 92 (hot-melt adhesive) as the adhesive 40a is attached to one surface of a resin sheet 90. The resin sheet 90 is made of the same resin material as the resin frame member 24. As the adhesive sheet 92, an adhesive 40a selected by the above-described method of selecting the adhesive is used.

In the present embodiment, the bonding step is performed by a roll-to-roll method. That is, the resin sheet 90 is pulled out from a first roll (not shown), while the adhesive sheet 92 is pulled out from a second roll (not shown), and the adhesive sheet 92 is attached to one surface of the resin sheet 90.

However, in the bonding step, the single adhesive sheet 92 may be attached to one surface of the single resin sheet 90 piece by piece. Alternatively, in the bonding step, the liquid adhesive 40a may be applied to one surface of the resin sheet 90.

Figure 14B:
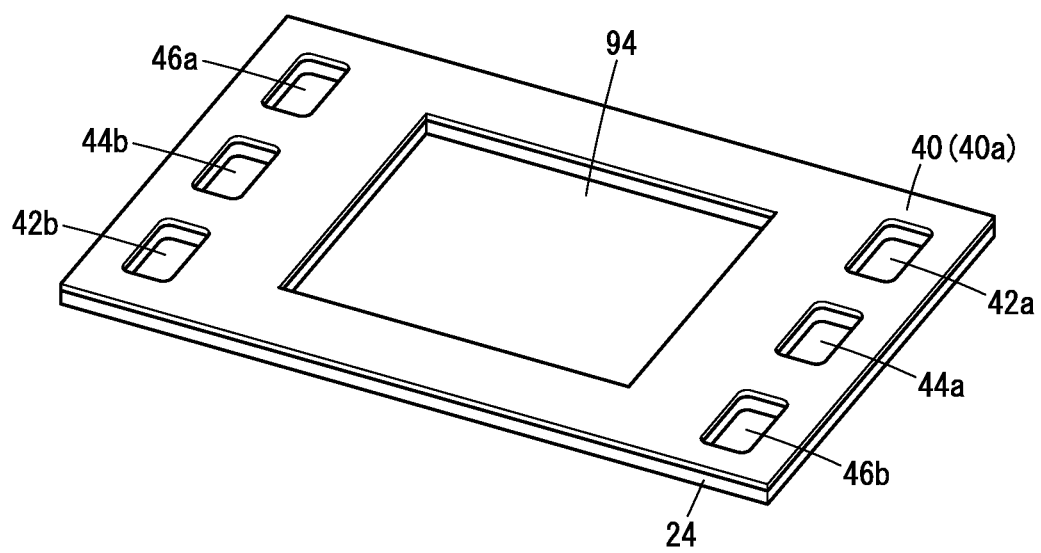
FIG. 14B is an explanatory view of a processing step.

Subsequently, in the processing step (step S11 in FIG. 13), a central hole 94 is formed in a central portion of the resin sheet 90 as illustrated in FIG. 14B. Further, the oxygen-containing gas supply passage 42a, the fuel gas discharge passage 46b, and the coolant supply passage 44a are formed at one end edge portion of the resin sheet 90. Further, the fuel gas supply passage 46a, the coolant discharge passage 44b, and the oxygen-containing gas discharge passage 42b are formed at the other end edge portion of the resin sheet 90. Finally, the outer periphery is trimmed. As a result, the resin frame member 24 having the adhesive layer 40, which is the adhesive 40a, firmly fixed to one surface thereof is formed. In the processing step, the central hole 94, the oxygen-containing gas supply passage 42a, the fuel gas discharge passage 46b, the coolant supply passage 44a, the fuel gas supply passage 46a, the coolant discharge passage 44b, and the oxygen-containing gas discharge passage 42b may be simultaneously formed in the resin sheet 90 by using a press die.

Figure 15:
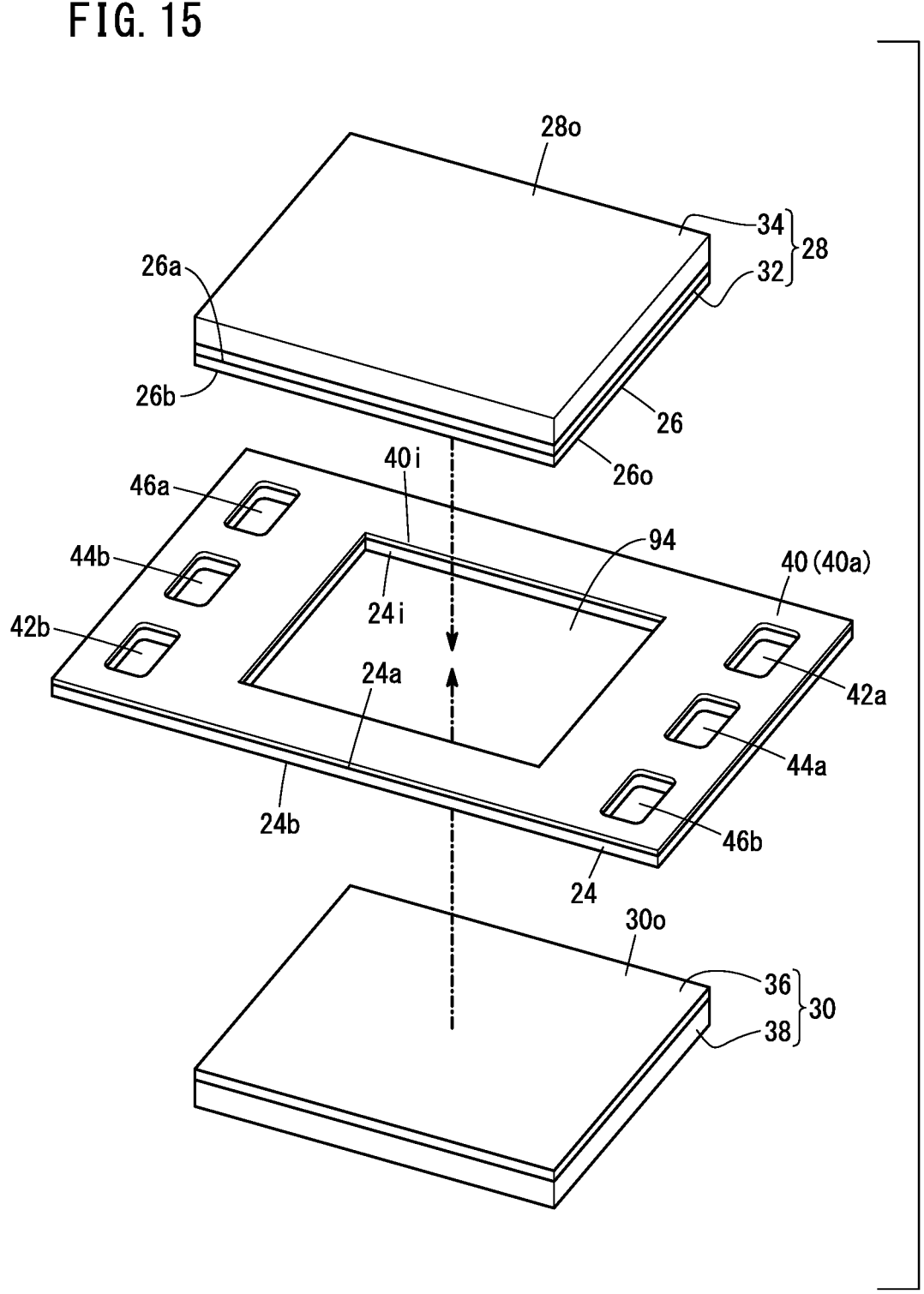
FIG. 15 is an explanatory view of a joining step.

In the joining step (step S12 of FIG. 13), as shown in FIG. 15, the resin frame member 24 provided with the adhesive layer 40, the first electrode 28, the electrolyte membrane 26, and the second electrode 30 are prepared. The first electrode 28 is bonded to one surface 26a of the electrolyte membrane 26 in advance. After that, the inner peripheral portion 24i of the resin frame member 24 (the inner peripheral portion 40i of the adhesive layer 40) is disposed between the outer peripheral portion 26o of the electrolyte membrane 26 and the outer peripheral portion 30o of the second electrode 30 and bonded together. At this time, the first electrode 28, the electrolyte membrane 26, the resin frame member 24, and the second electrode 30 stacked in the thickness direction are jointed together by a hot press for applying a load while heating.

As a result, the other surface 26b of the electrolyte membrane 26 and the second electrode 30 are joined to each other to form the MEA 22 (see FIGS. 1 and 2). The inner peripheral portion 40i of the adhesive layer 40 joins the outer peripheral portion 26o of the electrolyte membrane 26 and the inner peripheral portion 24i of the resin frame member 24 to each other. Thus, the resin frame equipped MEA 14 is formed.

Figure 16:
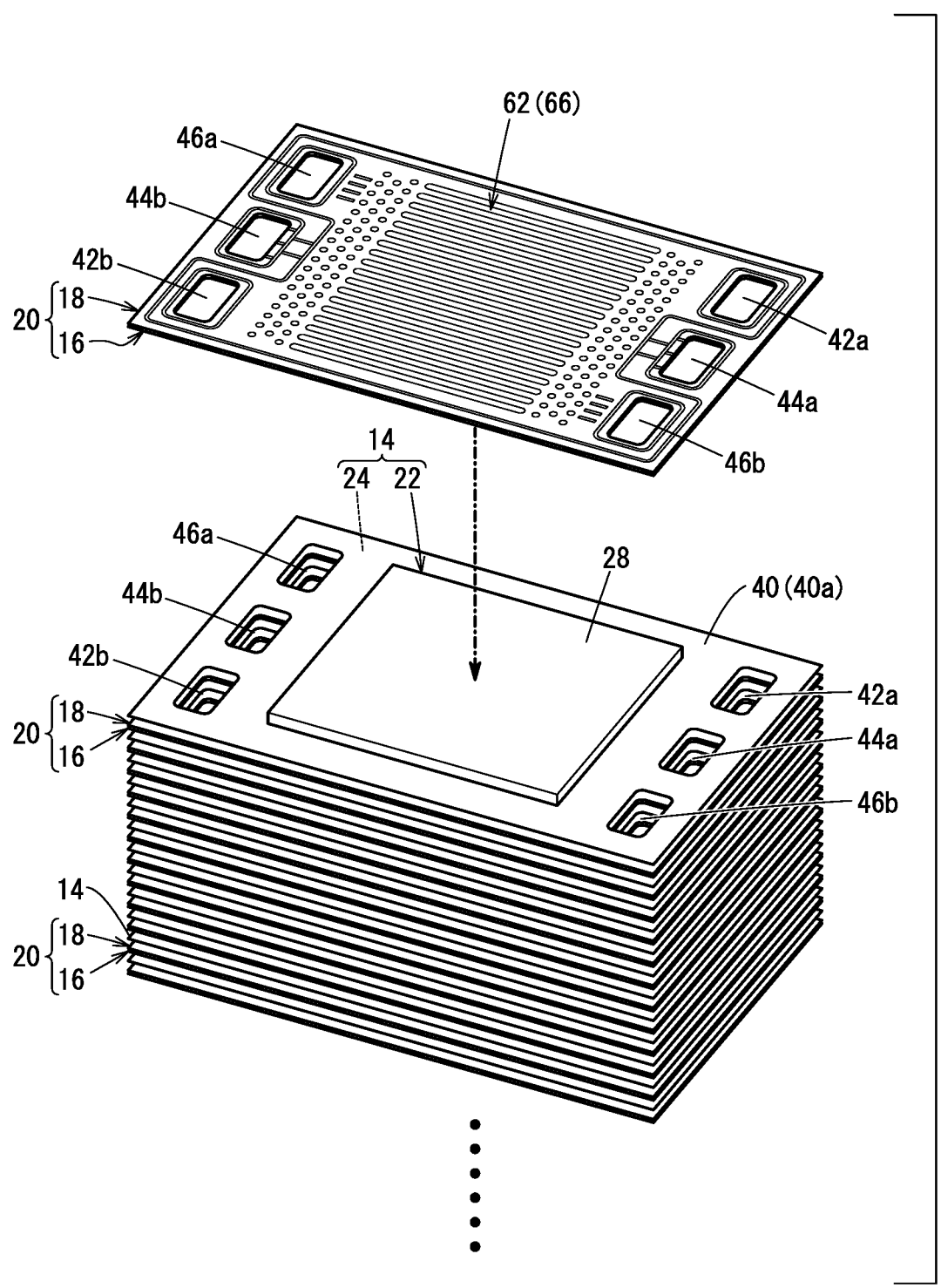
FIG. 16 is an explanatory view of a stacking step.

Thereafter, in the stacking step (step S13 in FIG. 13), a plurality of the resin frame equipped MEAs 14 and a plurality of the joint separators 20 are prepared. Each joint separator 20 is a member in which the first separator 16 and the second separator 18 are joined to each other. Thereafter, as shown in FIG. 16, the resin frame equipped MEAs 14 and the joint separators 20 are positioned and alternately stacked to form a plurality of power generation cells 10 (fuel cell stack 12). At this time, the top portion 60 of the first seal bead portion 54 of the first separator 16 comes into contact with the outer peripheral portion 40o of the adhesive layer 40 (see FIGS. 2, 4, 5, 7, and 8). That is, the outer peripheral portion 40o of the adhesive layer 40 joins the top portion 60 of the first seal bead portion 54 and the outer peripheral portion 24o of the resin frame member 24 to each other.

In the fuel cell stack 12, a terminal plate, an insulator, and an end plate (not shown) are disposed at each of both ends in the stacking direction, and a compressive load is applied to the fuel cell stack 12 in the stacking direction. When the stacking step is completed, a series of operation flow of the method for manufacturing the power generation cell 10 (fuel cell stack 12) is completed.

The present embodiment has the following advantageous effects.

In the power generation cell 10, the thermoplastic-resin adhesive 40a is provided so as to be exposed to the fluid flow path 78. In the method of selecting the adhesive 40a, a compressive load in the laminating direction is applied to the laminate body 86 in which the adhesive 84a is sandwiched between the first resin film 80 and the second resin film 82. In the method of selecting the adhesive 40a, the flow amount M of the adhesive 84a is measured when the laminate body 86 is exposed to an environment that is heated to a predetermined temperature and humidified to a predetermined humidity. Accordingly, it is possible to easily know the flow amount of the adhesive 84a in an environment close to the environment during operation of the power generation cell 10. Further, an adhesive whose measured flow amount M is equal to or less than a predetermined amount M1 is selected as the adhesive 40a used for the power generation cell 10. Therefore, it is possible to easily select an adhesive 40a that is not likely to be softened and flow into the fluid flow path 78 during operation of the power generation cell 10.

In the power generation cell 10, the adhesive layer 40, which is the adhesive 40a selected by the above-described method, is firmly fixed to the one surface 24a of the resin frame member 24. Therefore, even when the top portion 60 of the first seal bead portion 54 is brought into contact with the adhesive layer 40, the adhesive 40a is less likely to flow into the fluid flow path 78 during operation of the power generation cell 10. As a result, an increase in pressure loss of the fluid flowing through the fluid flow path 78 due to the adhesive 40a can be suppressed, and thus a decrease in power generation performance can be suppressed.

The adhesive 40a used for the power generation cell 10 is firmly fixed to one surface 24a of the resin frame member 24 and joins the top portion 60 of the first seal bead portion 54 to the resin frame member 24. The first seal bead portion 54 surrounds the fluid flow path 78 through which fluid such as a reactant gas for power generation or a coolant flows to prevent leakage of the fluid. The first seal bead portion 54 is formed integrally with the first separator 16 so as to protrude toward the resin frame member 24. The predetermined amount M1 is set to a flow amount such that the pressure loss of fluid due to the adhesive 40a flowing into the fluid flow path 78 from the resin frame member 24 during operation of the power generation cell 10 becomes an allowable upper limit value P1.

According to the above-described method, in the power generation cell 10 using the adhesive 40a selected by the method, it is possible to efficiently suppress an increase in pressure loss of the fluid in the fluid flow path 78 during operation of the power generation cell 10.

The surface size of the second resin film 82 is larger than the surface size of the first resin film 80. In the laminate-body forming step, the adhesive 84a is sandwiched between the first resin film 80 and the second resin film 82 in a state where the adhesive 84a is firmly fixed to one surface of the first resin film 80. In the measurement step, the amount of the adhesive 84a protruding from the outer periphery of the first resin film 80 is measured as the flow amount M.

In this method, the flow amount M of the adhesive 40a can be easily measured.

In the power generation cell 10, the fluid flow path 78 has passages (for example, the fuel gas supply passage 46a and the like) penetrating the first separator 16 in the thickness direction. The first seal bead portion 54 surrounds the passages.

According to such a configuration, it is possible to effectively suppress an increase in pressure loss due to the adhesive 40a flowing into the passage during operation of the power generation cell 10.

In the above-described embodiment, the adhesive layer 40, which is the adhesive 40a, may be provided on the other surface 24b of the resin frame member 24.

Note that the present invention is not limited to the embodiment described above, and various configurations can be adopted without departing from the gist of the present invention.

The embodiment described above can be summarized in the following manner.

According to the above embodiment, there is provided a method of selecting an adhesive (40a) of a thermoplastic resin provided so as to be exposed to a fluid flow path (78) of a power generation cell (10), the method including: a laminate-body forming step of forming a laminate body (86) by sandwiching an adhesive (84a) between a first resin film (80) and a second resin film (82); a load application step of applying a compressive load to the laminate body in a laminating direction thereof; an exposing step of exposing the laminate body to an environment heated to a predetermined temperature and humidified to a predetermined humidity; a measurement step of measuring a flow amount (M) of the adhesive at the exposing step; and a selecting step of selecting the adhesive having the flow amount that is equal to or less than a predetermined amount (M1), as an adhesive used for the power generation cell.

In the above method of selecting the adhesive, the power generation cell may include: an membrane electrode assembly (MEA) (22); a resin frame member (24) attached to an outer peripheral portion (22o) of the membrane electrode assembly so as to protrude outward from the outer peripheral portion; and a metal separator adjacent to the membrane electrode assembly, and the separator may include: a fluid flow path (78) through which a fluid flows, the fluid being a reactant gas for power generation or a coolant; and a seal bead portion (54) that surrounds the fluid flow path to prevent leakage of the fluid. Further, the seal bead portion may be integrally formed with the separator so as to protrude toward the resin frame member, the adhesive used for the power generation cell may be firmly fixed to one surface (24a) of the resin frame member and join a top portion (60) of the seal bead portion to the resin frame member, and the predetermined amount may be set to a flow amount at which a pressure loss of the fluid due to the adhesive flowing from the resin frame member into the fluid flow path during operation of the power generation cell becomes an allowable upper limit value (P1).

In the above method of selecting the adhesive, a surface size of the second resin film may be larger than a surface size of the first resin film; in the laminate-body forming step, the adhesive may be sandwiched between the first resin film and the second resin film in a state where the adhesive is firmly fixed to one surface of the first resin film; and in the measurement step, a protruding amount of the adhesive from an outer periphery of the first resin film may be measured as the flow amount.

According to the above embodiment, there is provided a power generation cell including: a resin frame equipped membrane electrode assembly (resin frame equipped MEA) (14) including a membrane electrode assembly (MEA) and a resin frame member attached to an outer peripheral portion of the membrane electrode assembly so as to protrude outward from the outer peripheral portion, the membrane electrode assembly including an electrolyte membrane (26) and a pair of electrodes (28, 30) disposed on both sides of the electrolyte membrane; and a pair of separators (16, 18) made of metal, disposed on both sides of the resin frame equipped membrane electrode assembly, wherein each of the pair of separators includes: a fluid flow path through which a fluid flows, the fluid being a reactant gas for power generation or a coolant; and a seal bead portion that surrounds the fluid flow path to prevent leakage of the fluid, wherein the seal bead portion is integrally formed with the separator so as to protrude toward the resin frame member, an adhesive layer (40) which is an adhesive of a thermoplastic resin is firmly fixed to one surface of the resin frame member, an inner peripheral portion of the adhesive layer joins an outer peripheral portion (26o) of the electrolyte membrane to an inner peripheral portion of the adhesive layer, and an outer peripheral portion of the adhesive layer joins a top portion of the seal bead portion to an outer peripheral portion of the resin frame member, and wherein the adhesive is selected by the above-described method of selecting the adhesive.

In the above-described power generation cell, the fluid flow path may have a passage (42a, 42b, 44a, 44b, 46a, 46b) penetrating the separator in a thickness direction thereof, and the seal bead portion may extend so as to surround the passage.

What is claimed is:

1. A method of selecting an adhesive of a thermoplastic resin provided so as to be exposed to a fluid flow path of a power generation cell, the method comprising:
   forming a laminate body by sandwiching an adhesive between a first resin film and a second resin film;
   applying a compressive load to the laminate body in a laminating direction thereof;
   exposing the laminate body to an environment heated to a predetermined temperature and humidified to a predetermined humidity;
   measuring a flow amount of the adhesive fluidized by applying compression load thereto and exposing the laminate body thereto; and
   selecting the adhesive having the flow amount that is equal to or less than a predetermined amount, as an adhesive used for the power generation cell.

2. The method of selecting the adhesive according to claim 1, wherein the power generation cell includes:

a membrane electrode assembly;

a resin frame member attached to an outer peripheral portion of the membrane electrode assembly so as to protrude outward from the outer peripheral portion; and a separator made of metal and being adjacent to the membrane electrode assembly, wherein the separator includes:

a fluid flow path through which a fluid flows, the fluid being a reactant gas for power generation or a coolant; and a seal bead portion that surrounds the fluid flow path to prevent leakage of the fluid, and wherein the seal bead portion is integrally formed with the separator so as to protrude toward the resin frame member, the adhesive used for the power generation cell is firmly fixed to one surface of the resin frame member and joins a top portion of the seal bead portion to the resin frame member, and the predetermined amount is set to a flow amount at which a pressure loss of the fluid due to the adhesive flowing from the resin frame member into the fluid flow path during operation of the power generation cell becomes an allowable upper limit value.

3. The method of selecting the adhesive according to claim 1, wherein a surface size of the second resin film is larger than a surface size of the first resin film, when forming the laminate body, the adhesive is sandwiched between the first resin film and the second resin film in a state where the adhesive is firmly fixed to one surface of the first resin film, and when measuring the flow amount, a protruding amount of the adhesive from an outer periphery of the first resin film is measured as the flow amount.

* * * * *